US005768565A

United States Patent [19]

Matsuda et al.

[11] Patent Number: 5,768,565

[45] Date of Patent: Jun. 16, 1998

[54] OPERATION VERIFICATION APPARATUS AND METHOD

[75] Inventors: Keigo Matsuda; Miwako Doi, both of Kanagawa-ken, Japan

[73] Assignee: Kabushiki Kaisha Toshiba, Japan

[21] Appl. No.: 496,253

[22] Filed: Jun. 28, 1995

[30] Foreign Application Priority Data

Aug. 11, 1994 [JP] Japan .................................... 6-188681

[51] Int. Cl.$^6$ .............................. G05B 19/04; G09B 7/00

[52] U.S. Cl. .............................................................. 395/500

[58] Field of Search ................................................ 395/500

[56] References Cited

U.S. PATENT DOCUMENTS

| | | | |
|---|---|---|---|
| 5,263,135 | 11/1993 | Dei | 395/502 |
| 5,406,502 | 4/1995 | Haramaty et al. | 364/551.01 |
| 5,482,051 | 1/1996 | Reddy et al. | 128/733 |
| 5,490,784 | 2/1996 | Carmein | 434/55 |
| 5,581,665 | 12/1996 | Sugiura et al. | 395/86 |

OTHER PUBLICATIONS

Pracher, J. et al., "Information Theory Analysis of Human Tracking Performance Using a Smart Stick Controller," from the 1989 National Aerospace and Electronics Conference, pp. 1843–1850.

Norman, Donald A., "Commentary:human error and the design of computer systems", from the Communications of the ACM, vol. 33, Jan. 1990.

Quinn, Clark N., "Explorability: Inferences at the Interface", from the 1992 Annual Hawaii International Conference of System Sciences, pp. 570–576.

"The Psychology of Everyday Things" by Donald A. Norman.

*Primary Examiner*—Kevin J. Teska
*Assistant Examiner*—N. L. Dehlitsch-Moats
*Attorney, Agent, or Firm*—Graham & James LLP

[57] ABSTRACT

An operation verification apparatus verifies the operation ability of an object for a user's operation. In the operation verification apparatus, an operation-imagination memory section stores operation-imagination information corresponding to a figure of each object in a three-dimensional virtual environment. The operation-imagination information is information relating to an operation method which a user imagines from the figure of a corresponding object. An environment information memory section stores environment information which includes position data and figure data of each object. An operation generation section generates operation method data for the object on which the user operates in accordance with the operation-imagination information and the environment information. A movable region memory section stores movable region data relating to a movable region within which each object can move in the virtual environment. An operation verification section compares the operation method data with the movable region data of the object and verifies whether the object is movable by the operation method.

19 Claims, 32 Drawing Sheets

| OBJECT NAME | OPERATION SURFACE | OPERATION · IMAGINATION RULE |
|---|---|---|
| OBJECT 1 | POLYGON 11 | OPERATION POINT : [CENTER POINT OF OPERATION SURFACE] OPERATION DIRECTION : [OPPOSITE VECTOR OF NORMAL LINE VECTOR OF THE CENTER POINT ON OPERATION SURFACE] |
| OBJECT 2 | POLYGON 21 | |

FIG. 4

| OBJECT NAME | OPERATION DIRECTION | OPERATION POINT |
|---|---|---|
| OBJECT 1 | $(V_{11}, V_{12}, V_{13})$ | $(X_1, Y_1, Z_1)$ |
| ⋮ | ⋮ | ⋮ |

FIG. 5

| OBJECT NAME | POSITION | POSTURE | SURFACE : PEAK COORDINATE |
|---|---|---|---|
| OBJECT 1 | $(X_{11}, Y_{12}, Z_{13})$ | $(a_1, e_1, r_1)$ | POLYGON 11 :<br>$P_{111}\ (X_{111}, Y_{111}, Z_{111})$<br>:<br>$P_{11n}\ (X_{11n}, Y_{11n}, Z_{11n})$<br><br>POLYGON 12 :<br>$P_{121}\ (X_{121}, Y_{121}, Z_{121})$<br>: |
| OBJECT 2 | $(X_{21}, Y_{22}, Z_{23})$ | $(a_2, e_2, r_2)$ | POLYGON 21 :<br>$P_{211}\ (X_{211}, Y_{211}, Z_{211})$<br>$P_{212}\ (X_{212}, Y_{212}, Z_{212})$<br>: |

FIG. 6

| OBJECT NAME | MOVABLE DIRECTION | | | MOVABLE LIMIT | | |
|---|---|---|---|---|---|---|
| | CENTER COORDINATE | DIRECTION VECTOR | MOVEMENT TYPE | UPPER LIMIT | LOWER LIMIT | INITIAL POSITION |
| OBJECT 1 | $(X_{11}, Y_{12}, Z_{13})$ | $(V_{11}', V_{12}', V_{13}')$ | PARALLEL | MAX 1 | MIN 1 | $(I_{11}, I_{12}, I_{13})$ |
| OBJECT 2 | $(X_{21}, Y_{22}, Z_{23})$ | $(V_{21}', V_{22}', V_{23}')$ | ROTATION | MAX 2 | MIN 2 | $(I_{21}, I_{22}, I_{23})$ |
| : | : | : | : | : | : | : |

FIG. 10

| OBJECT NAME | OPERATION SURFACE | OPERATION · IMAGINATION RULE |
|---|---|---|
| DIAL | { POLYGON 11<br>POLYGON 16<br>POLYGON 21 } | OPERATION POINT :<br>[ CENTER POINT OF OPERATION SURFACE ]<br>OPERATION DIRECTION :<br>[ TANGENT LINE OF ROTATION DIRECTION WHICH CENTER COORDINATE IS A POINT OF CONTACT ON SURFACE ] |

FIG. 19

| OBJECT NAME | OPERATION DIRECTION | OPERATION POINT |
|---|---|---|
| DIAL | ( $T_{11}$, $T_{12}$, $T_{13}$ )<br>( $T_{21}$, $T_{22}$, $T_{23}$ )<br>( $T_{31}$, $T_{32}$, $T_{33}$ ) | ( $C_{11}$, $C_{12}$, $C_{13}$ )<br>( $C_{21}$, $C_{22}$, $C_{23}$ )<br>( $C_{31}$, $C_{32}$, $C_{33}$ ) |

FIG. 20

| OBJECT NAME | POSITION | POSTURE | SURFACE : PEAK COORDINATE | PARENT OBJECT |
|---|---|---|---|---|
| BODY | $(X_{w1}, Y_{w1}, Z_{w1})$ | (aw1,ew1,rw1) | POLYGON ($_{w11}$) : | WORLD |
| | | | $P_{w111}(X_{w111}, Y_{w111}, Z_{w111})$<br>$P_{w112}(X_{w11}, Y_{w112}, Z_{w112})$<br>:<br>POLYGON ($_{w12}$) :<br>$P_{w121}(X_{w121}, Y_{w121}, Z_{w121})$<br>$P_{w122}$ $X_{w122}, Y_{w122}, Z_{w122})$<br>: | |
| HEAD | $(X_{B1}, Y_{B1}, Z_{B1})$ | $(a_{B1}, e_{B1}, r_{B1})$ | POLYGON ($_{B11}$) :<br>$P_{B111}(X_{B111}, Y_{B111}, Z_{B111})$<br>$P_{B112}(X_{B112}, Y_{B112}, Z_{B112})$<br>:<br>POLYGON ($_{B12}$) :<br>$P_{B121}(X_{B121}, Y_{B121}, Z_{B121})$<br>$P_{B122}(X_{B122}, Y_{B122}, Z_{B122})$<br>: | BODY |
| LEFT UPPER ARM | $(X_{B2}, Y_{B2}, Z_{B2})$ | $(a_{B2}, e_{B2}, r_{B2})$ | POLYGON ( B21 ) :<br>: | BODY |

FIG. 26

| OBJECT NAME | OPERATION SURFACE | OPERATION - IMAGINATION RULE | PRIORITY ORDER |
|---|---|---|---|
| DOOR HANDLE | THE BACK POLYGON | OPERATION POINT : [CENTER POINT OF OPERATION SURFACE] OPERATION DIRECTION [OPPOSITE VECTOR OF NORMAL LINE VECTOR OF THE CENTER POINT ON OPERATION SURFACE] | ① |
| | THE FRONT POLYGON | | ② |
| | THE LEFT SIDE POLYGON | | ③ |

FIG. 32

| OBJECT NAME | OPERATION DIRECTION | OPERATION POINT | PRIORITY ORDER |
|---|---|---|---|
| DOOR KNOB | ( $V_{B1}$, $V_{B2}$, $V_{B3}$ ) | ( $X_{B1}$, $Y_{B1}$, $Z_{B1}$ ) | ① |
| | ( $V_{F1}$, $V_{F2}$, $V_{F3}$ ) | ( $X_{F1}$, $Y_{F1}$, $Z_{F1}$ ) | ② |
| | ( $V_{S1}$, $V_{S2}$, $V_{S3}$ ) | ( $X_{S1}$, $Y_{S1}$, $Z_{S1}$ ) | ③ |

FIG. 34

OPERATION VERIFICATION APPARATUS AND METHOD

BACKGROUND OF THE INVENTION

1. Field of the Invention

The present invention relates to operation verification apparatus and method for generating operation method data from the figure of an object and for verifying operation ability of the object according to the operation method data.

2. Description of the Background Art

In the prior art, when a designer designs a figure of a product, he creates the figure so that the user might infer an operation method from the figure of the product. For example, in the case of a door handle or knob, the user can infer in which direction to move the door knob to open the door from various figures showing the door handle. FIG. 1 shows a short door handle attached in the vertical direction on the door surface. In this case, the user can infer from the figure of the door handle that the door is opened by pulling the door handle. FIG. 2 shows a long door handle attached in the horizontal direction on the door suface. In this case, the user can infer from the figure of the door handle that the door is opened by pushing the door handle. In these ways, the characteristics from which the user infers (imagines) the operation method is called "affordance". From this view point, the designer designs figures of the product according to affordance suitable for operation. In the example of FIGS. 1 and 2, affordance is changed by the appearance of the door knob and its attached position. Therefore, the user can infer that each door is opened in a different direction.

However, there are many products which are not suitable for a user's operation. For example, when he tries to pull toward himself the door knob attached in the vertical direction on the door, the door is not opened. Next, he tries to push on the back side of the door handle, but the door is not opened. Lastly, when he tries to slide to the right side the door handle, the door is opened. Similar cases are often encountered in daily life. That is a reason why a designer may not design the figure of a product according to the user's operation ability. For example, it happens that some engineers do not consider operation ability of a product because of reducing cost. In the case of the user, it happens that he buys the product in view of low price, and he finds the operation ability of the product is bad when he actually uses the product.

As mentioned-above, many designers often design the figure of the product without understanding the affordance of the product. In short, it often happens that the actual operation method of the product and operation method inferred from the figure of the product are different. Therefore, many users cannot use the product easily.

SUMMARY OF THE INVENTION

It is therefore an object of the present invention to provide an operation verification apparatus and method to enable a designer to design a figure of a product in consideration of affordance of the product.

It is another object of the present invention to provide an operation verification apparatus and method to enable a user to use a product smoothly by an operation method inferred from a figure of the product.

BRIEF DESCRIPTION OF DRAWINGS

FIG. 4 is an example of affordance data according to the present invention.

FIG. 5 is an example of operation method data according to the present invention.

FIG. 6 is an example of environment information according to the present invention.

FIG. 10 is an example of movable region data according to the second embodiment of the present invention.

FIG. 19 is an example of affordance data of the dial according to the second embodiment of the present invention.

FIG. 20 is an example of operation method data of the dial according to the second embodiment of the present invention.

FIG. 26 is an example of environment information of a human model according to the fourth embodiment of the present invention.

FIG. 32 is an example of affordance data including priority order according to a fifth embodiment of the present invention.

FIG. 34 is an example of operation method data including priority order according to the fifth embodiment of the present invention.

DETAILED DESCRIPTION OF THE PREFERRED EMBODIMENTS

Figure 3:
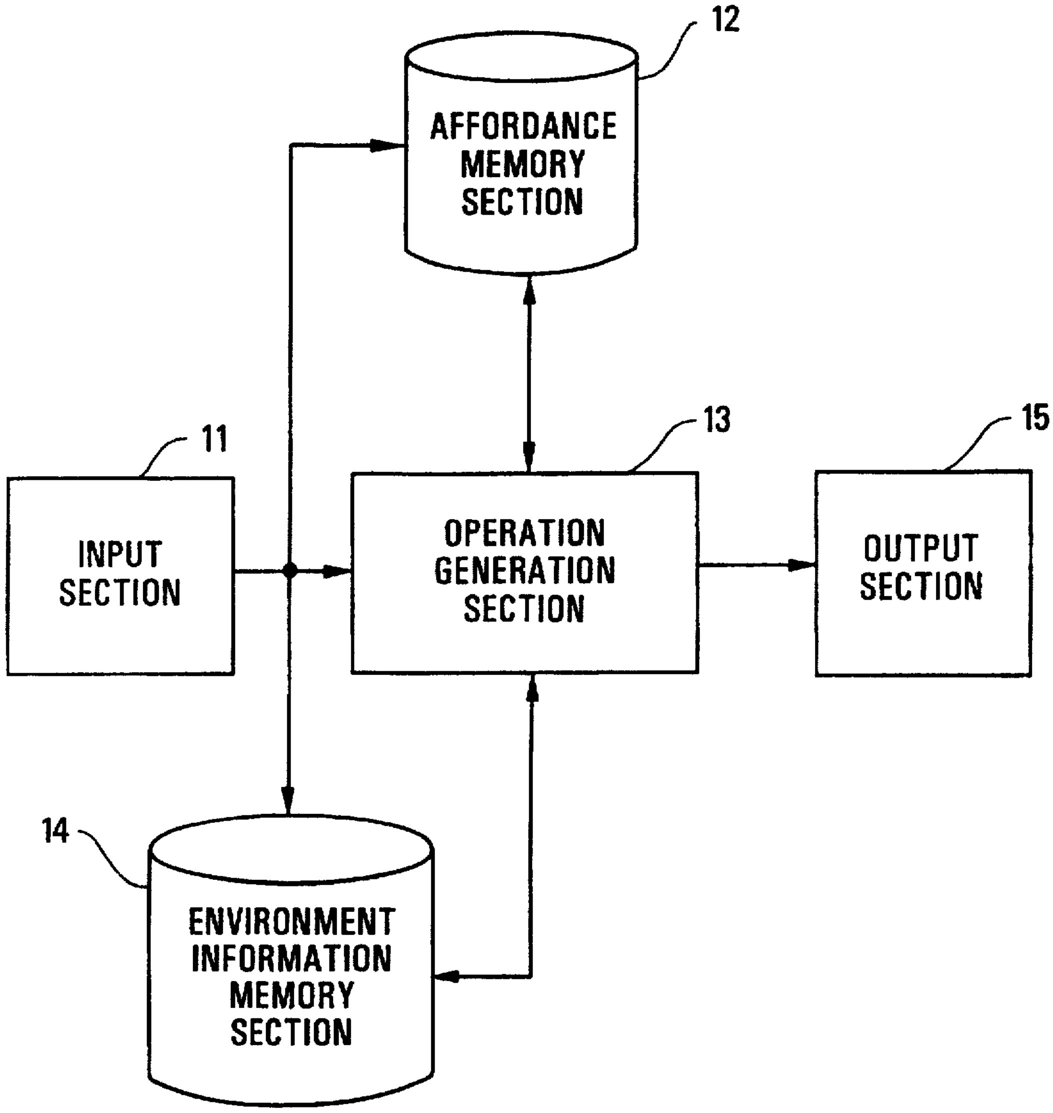
FIG. 3 is a block diagram of operation verification apparatus according to a first embodiment of the present invention.

FIG. 3 is a block diagram of operation verification apparatus according to a first embodiment. As shown in FIG. 3, the operation verification apparatus is comprised of an input section 11, an affordance memory section 12, an operation generation section 13, an environment information memory section 14 and an output section 15. The maker previously supplies affordance data, and the user supplies environment information of each object through the input section 11.

The affordance memory section 12 stores the affordance data of each object through the input section 11. As mentioned above, the affordance data is operation method data which the user imagines (infers) from a figure of the object. For example, as for a door knob whose figure is circular, the operation method for rotation by hand is imagined. These affordance data are determined by the figure of the object when each object is designed. FIG. 4 is a format of affordance data. As shown in FIG. 4, the affordance data is comprised of an operation surface and an operation-imagination rule by unit of object. The operation surface is a special polygon of the object which the user should touch when he operates the object. The an operation-imagination rule includes an operation point and operation direction.

The operation point is a predetermined point on the object which the user should touch with his hand (finger) on the special polygon. The operation direction is a predetermined direction of the object which the user should push to operate the object.

These affordance data of each object are previously described when each object is designed, and then they are stored in the affordance memory section 12.

The operation generation section 13 actually calculates the operation direction and the operation point of the object according to the affordance data and environment information of the object. The operation direction and the operation point are called "operation method data". FIG. 5 is a format of the operation method data.

The environment information memory section 14 stores the environment information of each object through the input section 11. The environment information is comprised of position, posture(orientation), surface (polygon) and peak (vertex)coordinates of each polygon of each object in three-dimensional virtual space. FIG. 6 is a format of the environment information. In FIG. 6, the position data, the posture data and the peak coordinate value are based on world (global) coordinate axis X-Y-Z. The world coordinate axis is previously fixed in three-dimensional virtual space. The position data is the spacial position of the center of gravity of the object. The posture data is a rotation angle of the object around the three-dimensional axis X-Y-Z. The surface data is each polygon number of the object. The peak coordinate value is the spacial coordinate of each peak point of the polygon.

The output section 15 outputs the operation method data generated from the operation generation section 13.

Figure 7:
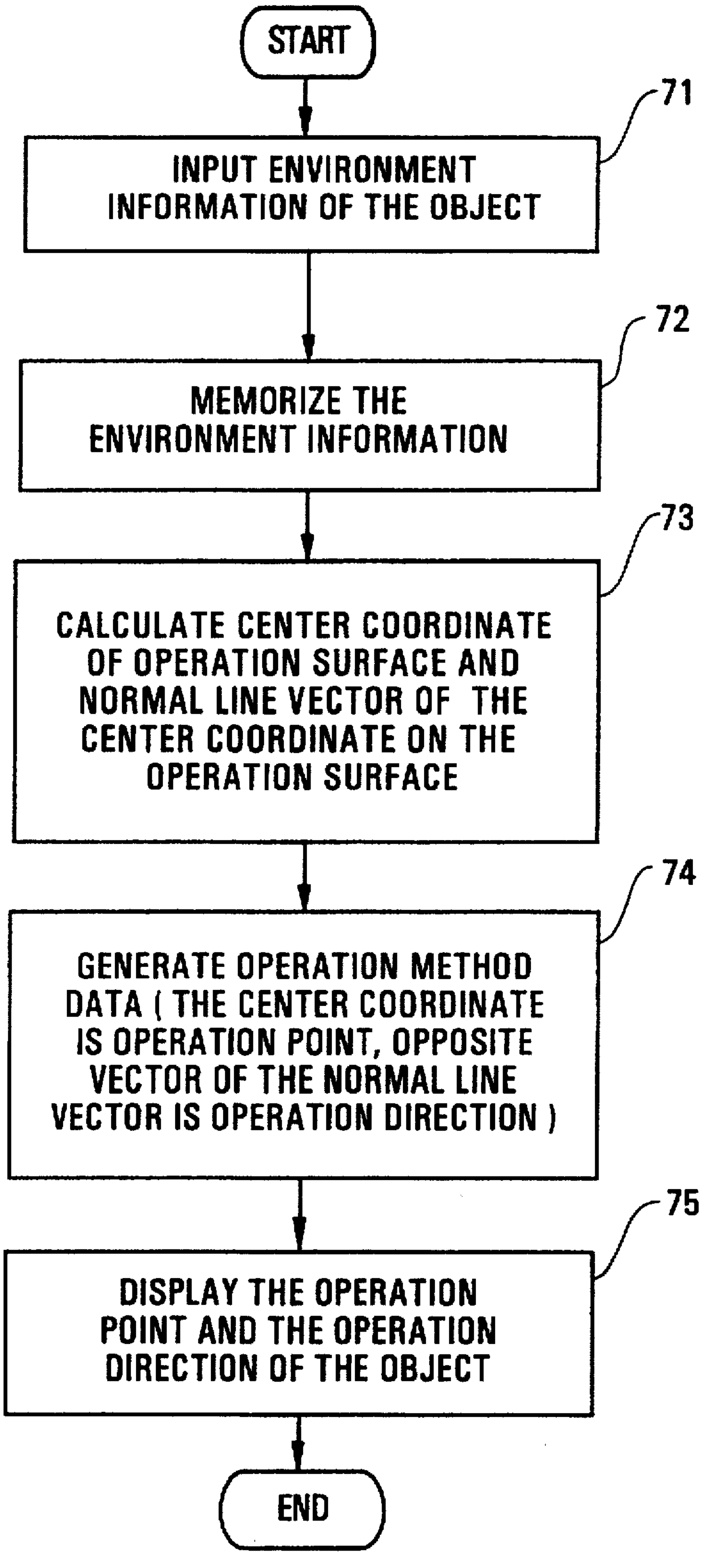
FIG. 7 is a flow chart of an operation verification method according to the first embodiment of the present invention.

FIG. 7 is a flow chart of an operation verification method according to the first embodiment of the present invention. The generation processing of operation method data will be explained in detail. First, the environment information of each object in virtual space is supplied through the input section 11 (step 71). Then, the environment information is stored in the environment information memory section 14 (step 72). The operation generation section 13 generates operation method data by using the environment information and the affordance data of the object (step 73). For example, it is assumed that object 1 is designated to calculate the operation method data. First, the operation surface data (polygon 11) and the operation-imagination rule are extracted from the affordance data shown in FIG. 4. Then, the peak coordinate of polygon 11 is extracted from the environment information shown in FIG. 6. Next, a center point $(X_1,Y_1,Z_1)$ of operation surface (polygon 11) is calculated by using peak coordinate $P_{111}, \ldots, P_{11n}$. This center point is the operation point according to the operation point rule. Next, a normal line vector of the center point on the operation surface (polygon 11) is calculated by using the center point coordinate $(X_1,Y_1,Z_1)$ and the equation of polygon 11. An operation direction $(V_{11},V_{12},V_{13})$ is an opposite vector of the normal line vector according to the operation direction rule. In these ways, the operation direction $(V_{11},V_{12},V_{13})$ and the operation point $(X_1,Y_1,Z_1)$ are stored as the operation method data shown in FIG. 5 (step 74).

Figure 1:
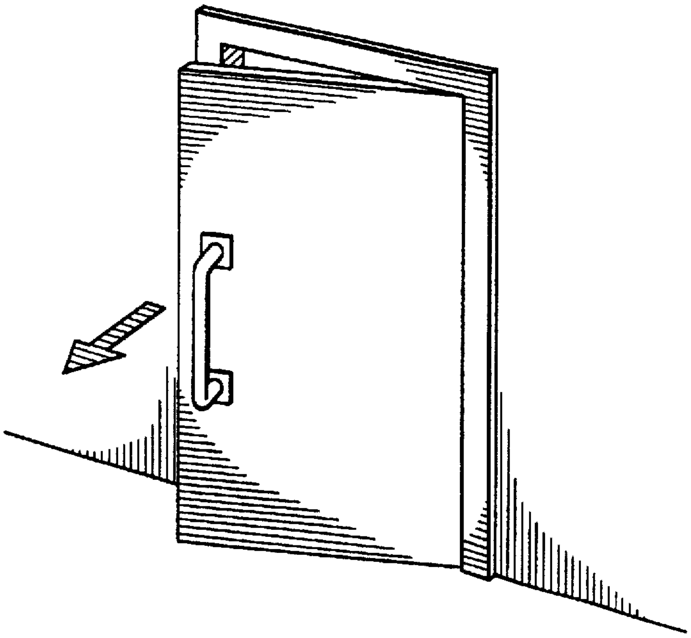
FIG. 1 and FIG. 2 are examples of the figure of a door handle.
Figure 2:
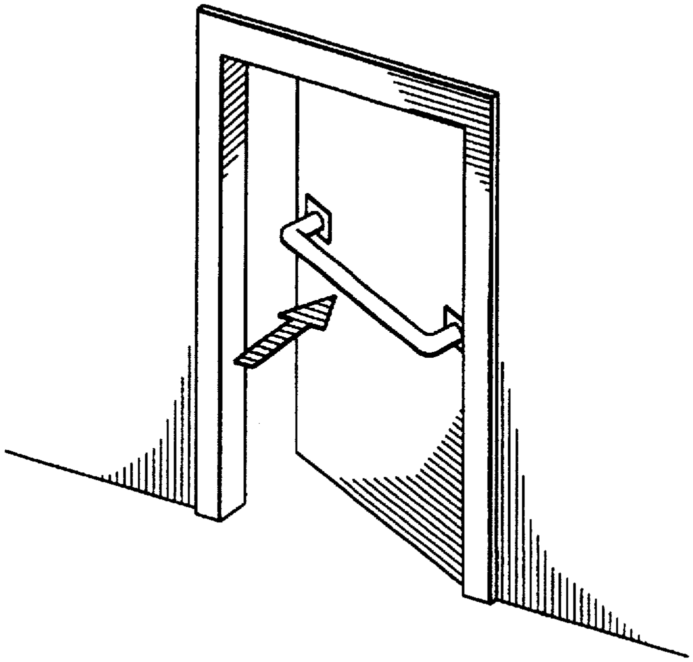
Figure 8:
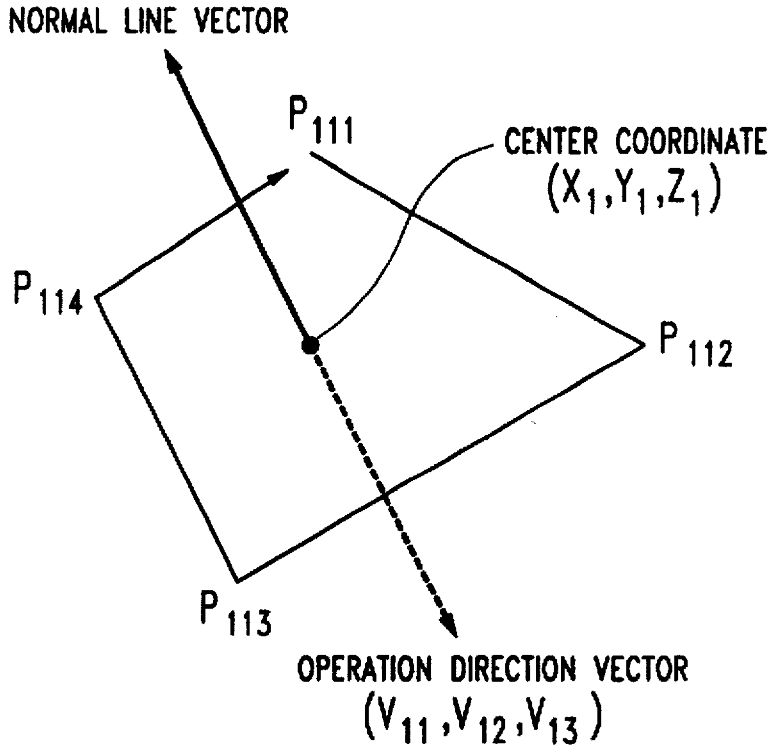
FIG. 8 is an example of an affordance operation of an object according to the first embodiment of the present invention.

FIG. 8 shows the relation of the polygon and the operation direction vector. In FIG. 8, the object (polygon 11) is displayed as four peak coordinates $P_{111},P_{112},P_{113},P_{114}$. The center coordinate $(X_1,Y_1,Z_1)$ is displayed as a black dot on the polygon, and the operation direction is displayed as a broken line whose start point is the center coordinate and end point direction is an arrow. Lastly, the output section 15 displays the operation method data on the object by character or computer graphics as shown in FIGS. 1 and 2. (step 75).

Figure 9:
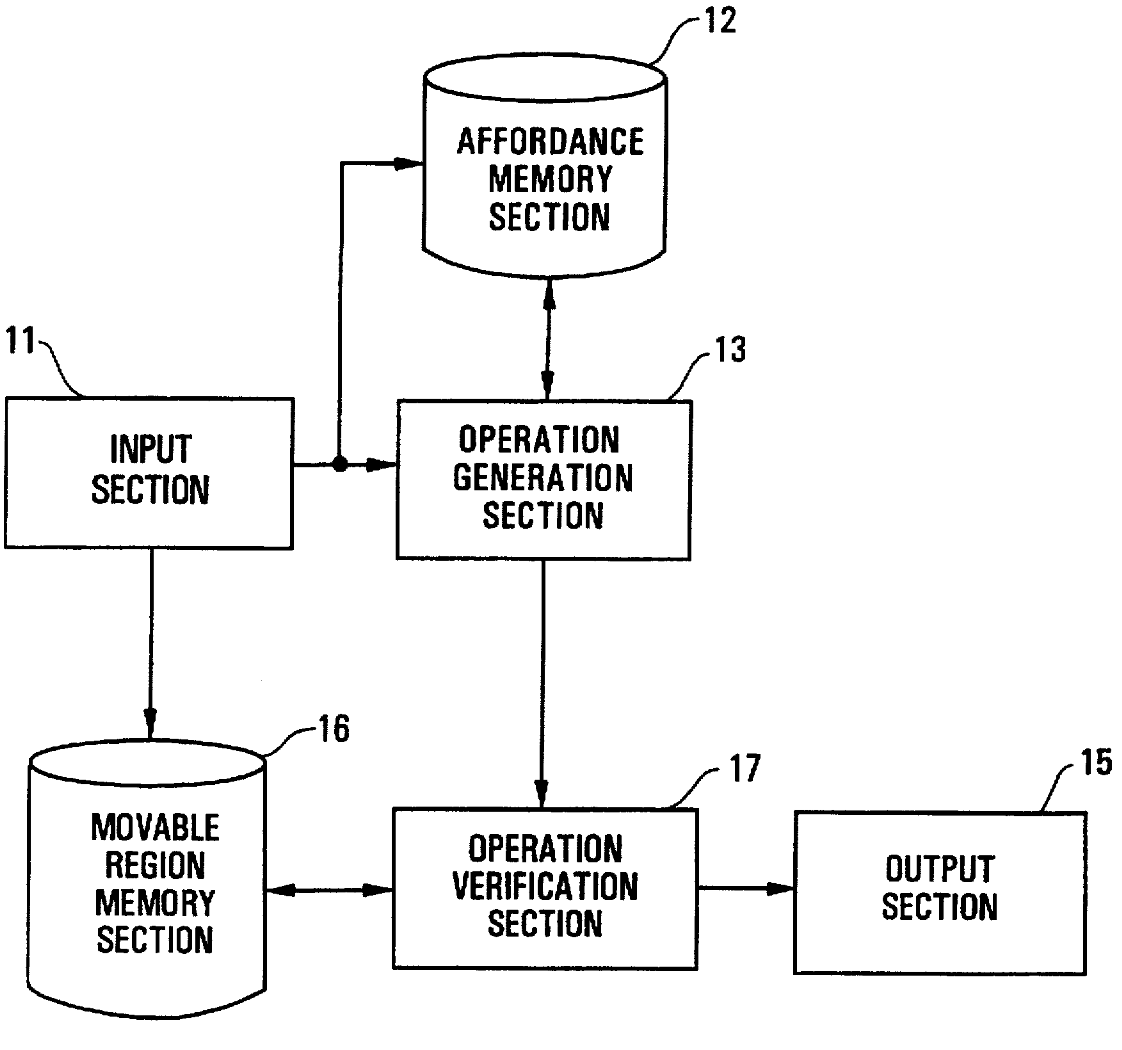
FIG. 9 is a block diagram of operation verification apparatus according to a second embodiment of the present invention.

A feature of a second embodiment is that the operation method data is verified by using movable region data. FIG. 9 is a block diagram of operation verification apparatus according to the second embodiment. The input section 11 is the supply section for the affordance data and the movable region data of each object. The affordance memory section 12 and the operation generation section 13 are the same as those of the first embodiment. The movable region memory section 16 stores the movable region data through the input section 11. The movable region data of each object is previously described when the object is designed. FIG. 10 is a format of the movable region data. As shown in FIG. 10, the movable region data is comprised of movable direction data and movable limit data. The movable direction data includes center coordinate, direction vector and movement type, which are based on local coordinate axis X-Y-Z. The local coordinate axis is previously fixed to each object. In the movable direction data, the center coordinate is the spacial center of gravity of the object, which is same as the position data of FIG. 6. The direction vector is the moving direction of the object in three-dimensional virtual space. The movement type is the moving characteristic of the object. The movable limit data includes an upper limit, lower limit and initial position. The upper limit and the lower limit are moving distances of the object in three-dimensional virtual space, which are based on the initial position of the object. In FIG. 10, the object 1 moves in parallel along the direction vector ($V_{11}$',$V_{12}$',$V_{13}$'), the moving distance being within (MAX1–MIN1). The object 2 rotates around an axis which is parallel to the direction vector($V_{21}$',$V_{22}$', $V_{23}$') and passes through the center coordinate ($X_{21}$,$Y_{22}$,$Z_{23}$), the rotation angle being within (MAX2–MIN2).

An operation verification section 17 compares the operation method data with the movable region data of the object, and decides whether the object is moved by the operation method.

Figure 11:
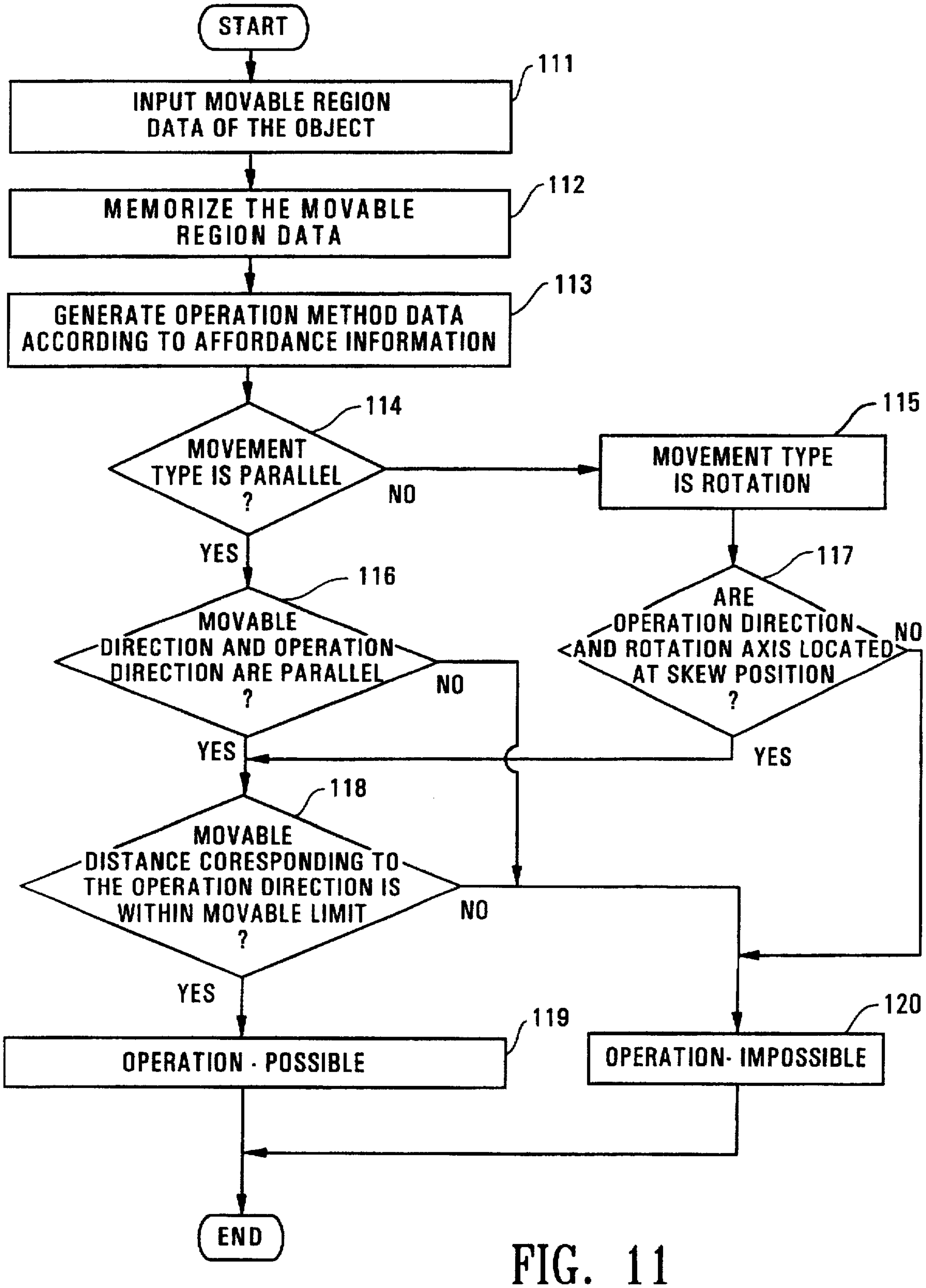
FIG. 11 is a flow chart of an operation verification method according to the second embodiment of the present invention.

FIG. 11 is a flow chart of an operation verification method according to the second embodiment. The process of verifying the operation method data will be explained in detail. First, the movable region data of each object is supplied through the input section 11 (step 111). Then, the movable region data is stored in the movable region memory section 16 (step 112). The operation generation section 13 generates the operation method data of designated object according to the affordance data of the object (step 113). The operation method data is provided to the operation verification section 17. The operation verification section 17 extracts the movable region data of the object from the movable region memory section 16. Then, the operation verification section 17 decides that the kind of movable region data is parallel or rotation (step 114,115). If it is parallel, the operation verification section 17 decides that the movable direction of the movable region data is parallel to the operation direction of the operation method data (step 116). If the movable direction is parallel to the operation direction, the operation verification section 17 decides that the movable distance corresponding to the operation direction is within the movable limit of the movable region data (step 118). If the movable distance is within the movable limit, the object is decided to be movable by the operation method (step 119). If the type of movable region data is rotation, the operation verification section 17 decides that the operation direction of the operation method data is located at a skewed position to the rotation axis of the direction vector of the movable region data (step 117). If the operation direction is skewed to the rotation axis, the operation verification section 17 decides whether the movable angle corresponding to the operation direction around the rotation axis is within the movable limit of the movable region data (step 118). If the movable angle is within the movable limit, the object is decided to be movable by the operation method (step 119). Otherwise, the object is decided not to be movable by the operation method (step 120).

Figure 12:
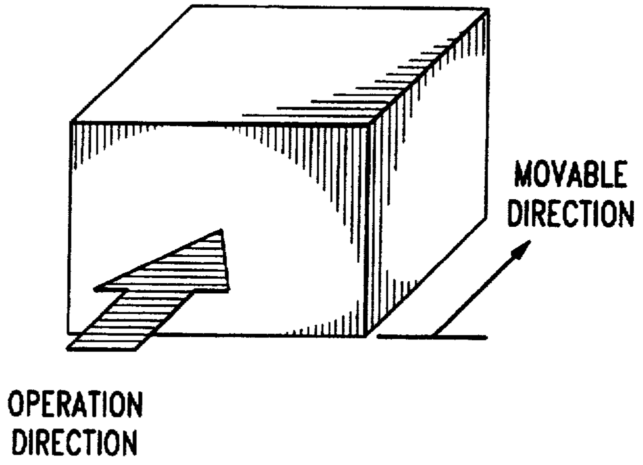
FIG. 12 is a success example of a parallel moving operation for an object.
Figure 13:
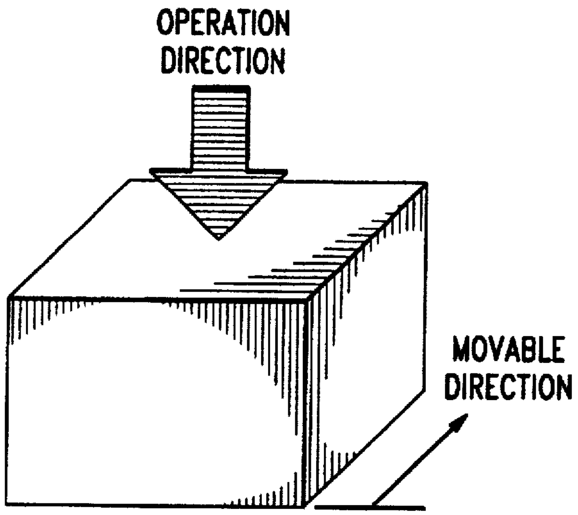
FIG. 13 is a failure example of the parallel moving operation for the object.
Figure 14:
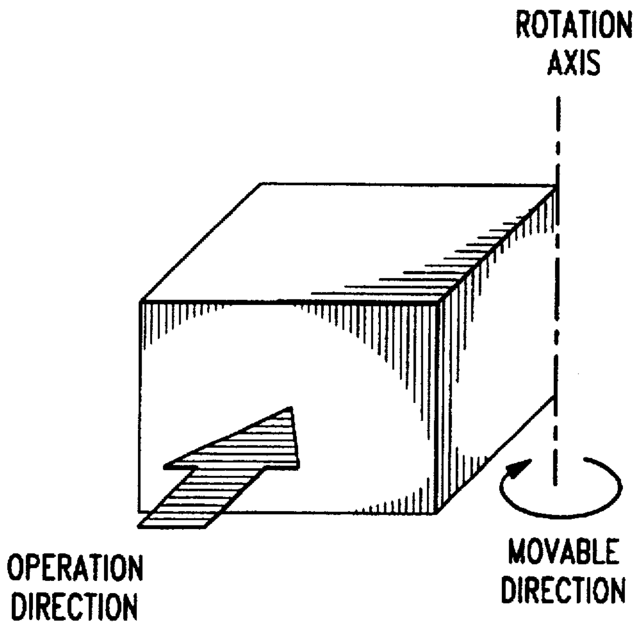
FIG. 14 is a success example of a rotation moving operation for the object.
Figure 15:
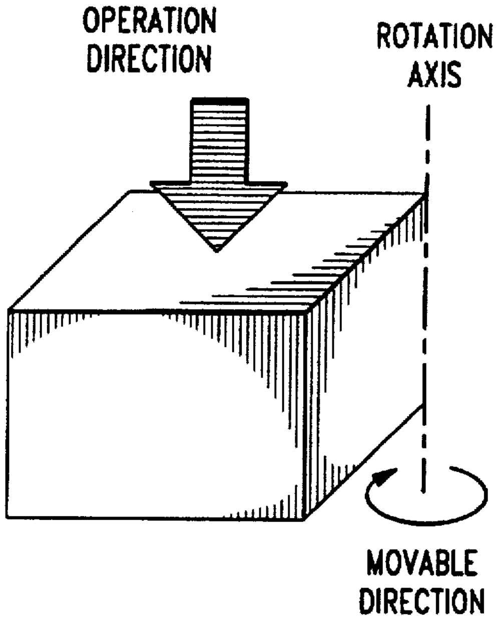
FIG. 15 is a failure example of the rotation moving operation for the object.

FIG. 12 and FIG. 13 are examples of affordance-verification of a parallel-moving object. FIG. 14 and FIG. 15 are examples of affordance-verification of a rotation-moving object. First, in FIG. 12, the operation direction and movable direction of the object are the same (parallel) and the object is moved according to the operation direction. In FIG. 13, the operation direction and movable direction of the object are different from each other. Therefore, the object is not moved according to the operation direction. In FIG. 14, the operation direction is skewed to the rotation axis of the object (skew position) and the object is moved according to the operation direction. In FIG. 15, the operation direction and rotation axis direction are the same (parallel) though the object moves around the rotation axis. Therefore, the object is not moved according to the operation direction.

Figure 16:
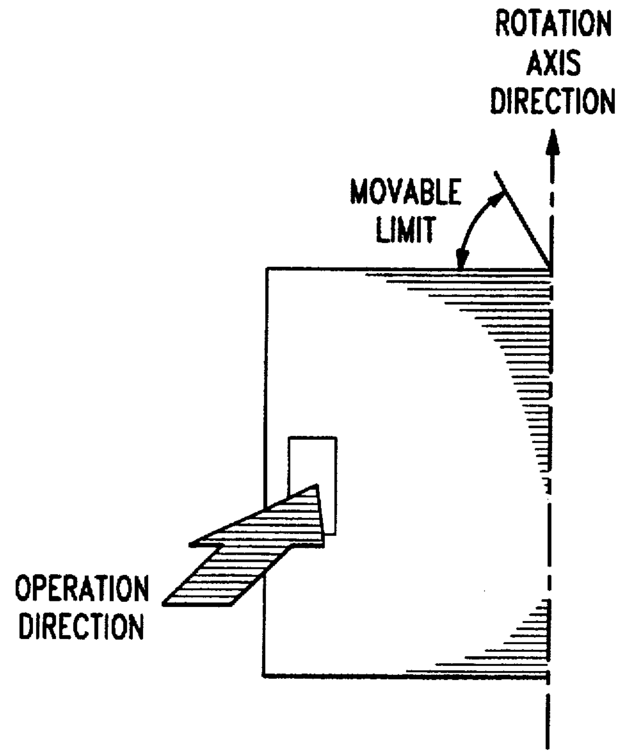
FIG. 16 and FIG. 17 are affordance-verification examples of a door.
Figure 17:
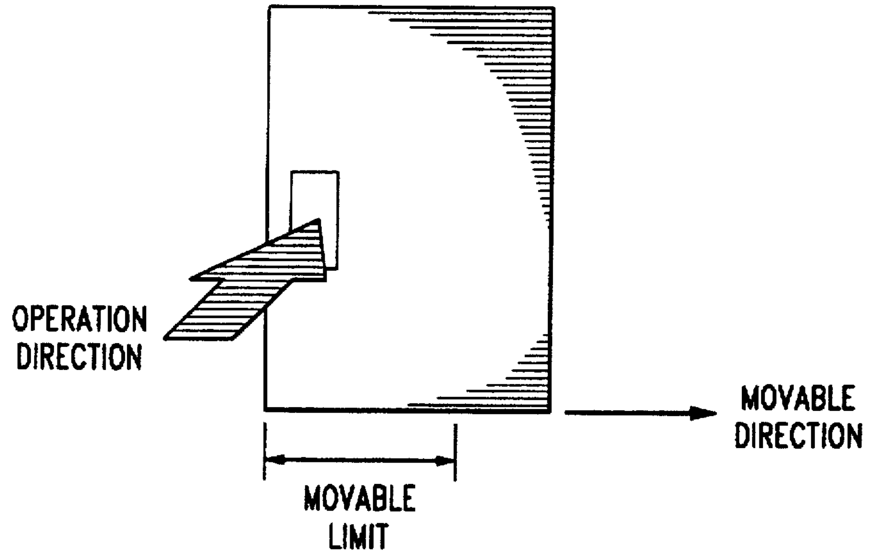

FIG. 16 and FIG. 17 are examples of affordance-verification of a door. In FIG. 16 and FIG. 17, the figures of both doors are the same (same affordance data), but movable region data of both doors are different. In FIG. 16, the type of movement of the door is rotation. The operation direction and the rotation axis direction of the door are skewed to each other, and the operation direction is in accord with the movable limit of rotation. Therefore, the door is opened by operation corresponding to affordance of the door. On the other hand, in FIG. 17, the type of movement of the door is parallel-moving. The operation direction and the movable direction are different. Therefore, the door is not opened by operation corresponding to affordance of the door. In short, it is decided that the figure of the door shown in FIG. 16 is designed correctly, but the figure of the door shown in FIG. 17 is designed incorrectly.

Lastly, the output section 15 receives the verification result from the operation verification section 17 and displays the verification result by character or computer graphic.

In the second embodiment, each user may input his affordance data for storage in the affordance memory section 12 through the input section 11. Then, each operation method data is generated from each user's affordance data respectively. Therefore, each operation method data corresponding to each user's tendency is able to be verified by the moving region data.

Figure 18:
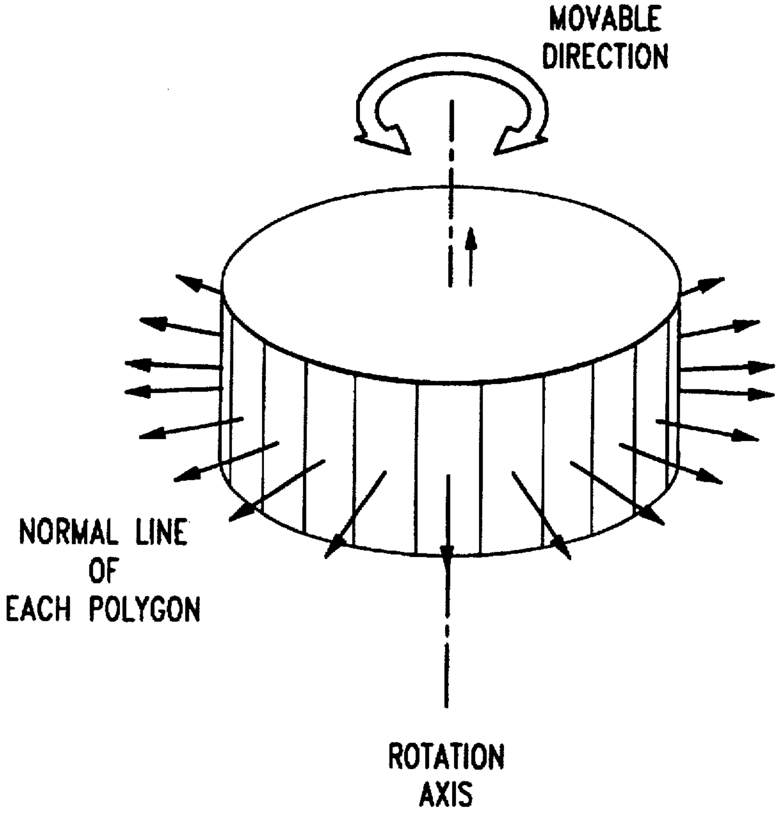
FIG. 18 is an example of a dial consisting of many polygons.

Next, processing of affordance-verification of an object whose figure is complicated will be explained in detail. In the second embodiment as mentioned-above, affordance data is determined by the figure of the operation surface of the object. Therefore, the operation method data is the simple action of pushing in the opposite direction of the normal direction on the operation surface. In short, it is impossible to generate operation data of moving in the parallel direction on the operation surface. For example, FIG. 18 is a dial whose side surface is comprised of many polygons including normal lines respectively. In FIG. 18, operation method data, which is to push in the opposite direction of the normal line on each polygon, is generated. However, the correct operation method data is rotation around the central axis of the dial. In order to generate correct operation method data, affordance data of this kind of object is improved.

Figure 21:
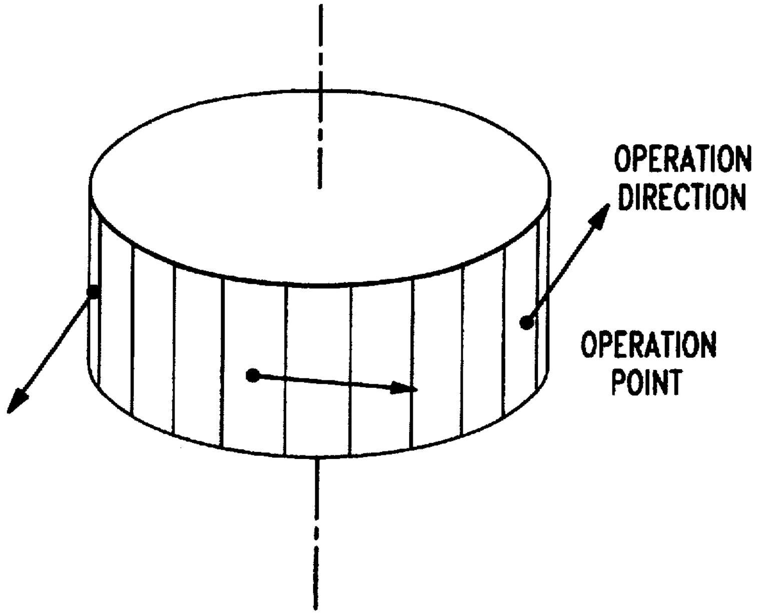
FIG. 21 is an example of a rotation operation for the dial according to the second embodiment of the present invention.

FIG. 19 is a format of affordance data of this dial. As shown in FIG. 19, the affordance data includes plural operation surfaces (polygon 11, polygon 16, polygon 21) and operation-imagination rules. The operation-imagination rule is commonly applied to each polygon. The operation generation section 13 generates plural operation method data corresponding to each polygon by using the operation-imagination rule. FIG. 20 is a format of plural operation method data of the dial. Three sets of operation directions and operation points correspond to three polygons respectively. In FIG. 20, the operation direction is a tangent line of rotation direction and the operation point is a contact point of the tangent line on each polygon. FIG. 21 is an example of the dial including an operation direction and an operation point. For the user's actual operation, the operation point is a touch point of the finger and the operation direction is the rotation direction of the finger. Therefore, the user touches three operation points with three fingers respectively and rotates toward three operation directions with the three fingers, respectively.

Figure 22:
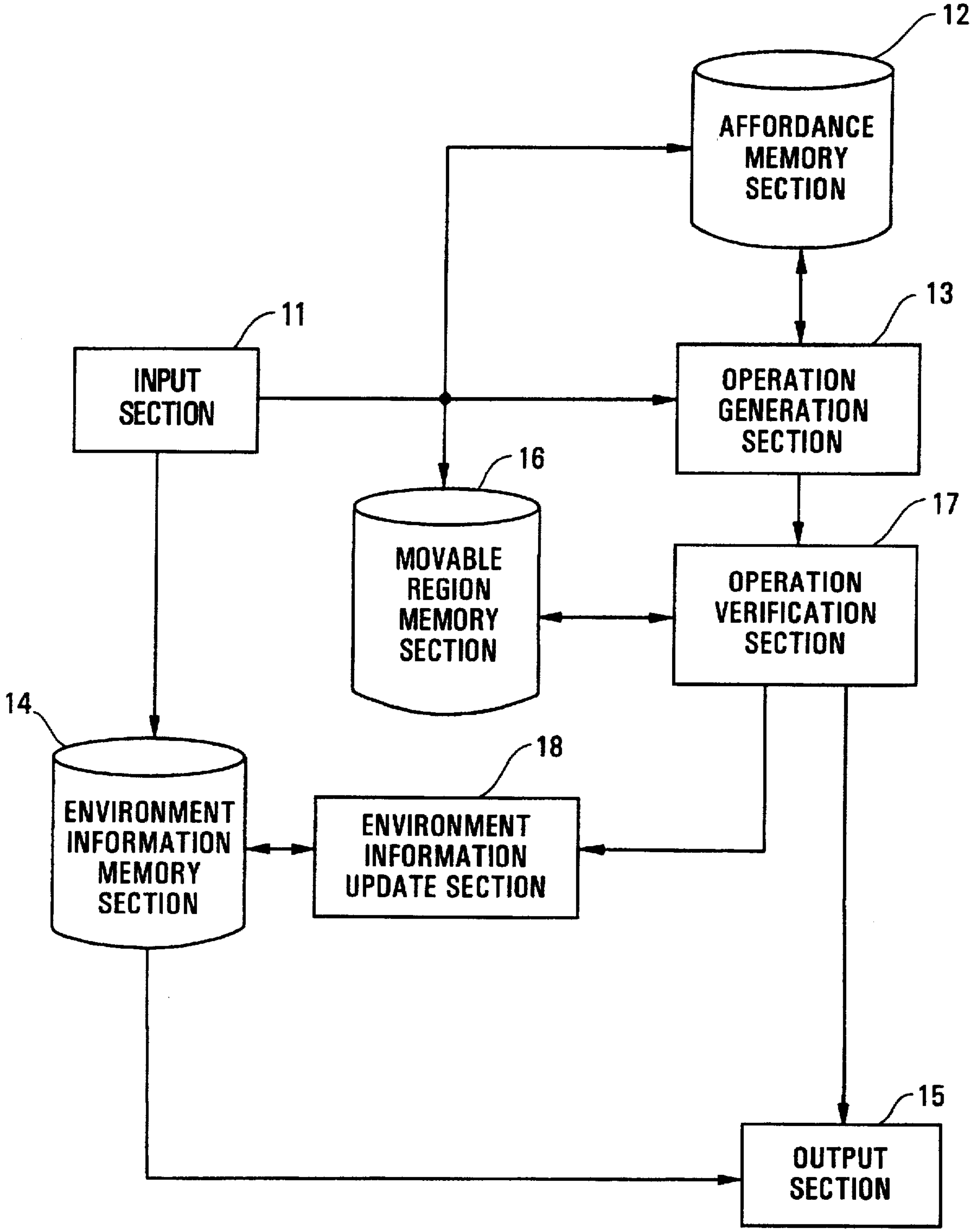
FIG. 22 is a block diagram of operation verification apparatus according to a third embodiment of the present invention.

A feature of a third embodiment is that the environment information of an object is updated according to user's operation for the object. FIG. 22 is a block diagram of the operation verification apparatus of the third embodiment. Each section of the third embodiment is the same as that of the second embodiment except for environment information update section 18. The environment information update section 18 calculates movable data of the object according to the operation-verification result from the operation verification section 17, and updates the environment information of the object according to the moving data.

Figure 23:
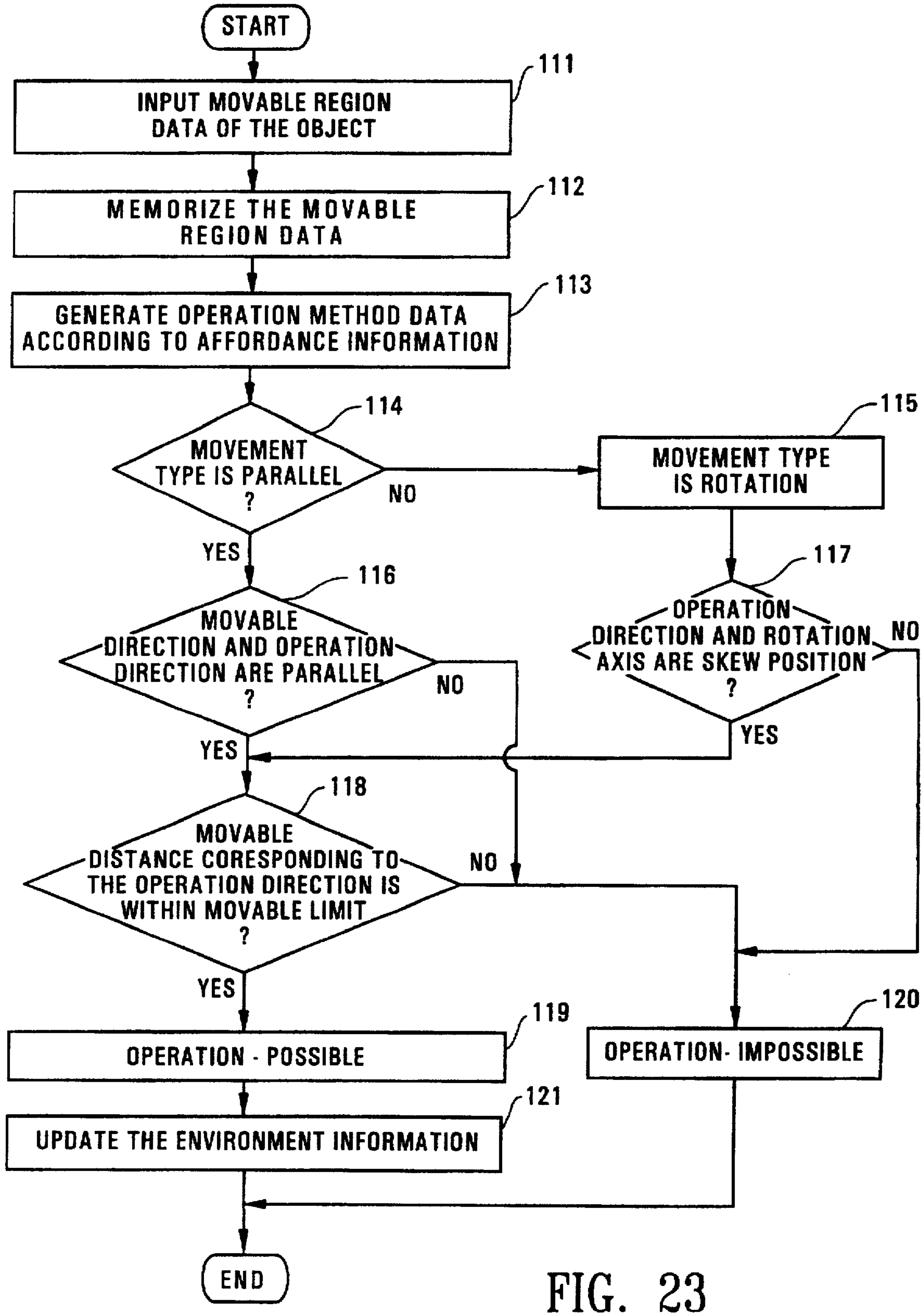
FIG. 23 is a flow chart of an operation verification method according to the third embodiment of the present invention.

FIG. 23 is a flow chart of the operation verification method of the third embodiment. The flow chart of FIG. 23 is the same as that of FIG. 11 except for step 121. The process of updating environment information will be explained in detail.

First, the environment information update section 18 receives the operation method data with the verification result from the operation verification section 17. If the verification result is that the object is moved by the operation method, the environment information update section 18 calculates moving data (coordinate-transformation matrix) of the object according to the operation method data. In this case, if the type of movement of the object is parallel, the following transformation formula is used to calculate the next position of the object.

$$\begin{pmatrix} X' \\ Y' \\ Z' \\ 1 \end{pmatrix} = \begin{pmatrix} 1 & 0 & 0 & V_x \\ 0 & 1 & 0 & V_y \\ 0 & 0 & 1 & V_z \\ 0 & 0 & 0 & 1 \end{pmatrix} \cdot \begin{pmatrix} X \\ Y \\ Z \\ 1 \end{pmatrix}$$

In the above formula, (X,Y,Z) is the spacial position of the object before moving, (X',Y',Z') is the spacial position of the object after moving, and $(V_x, V_y, V_z)$ is parallel-moving distance of the object toward the X-Y-Z axis direction respectively. The parallel-moving distance $(V_x, V_y, V_z)$ is previously determined by operation direction and operation point of the parallel-moving object.

If the type of movement of the object is rotation, the following transformation formula is used to calculate the new position of the object.

$$\begin{pmatrix} X' \\ Y' \\ Z' \\ 1 \end{pmatrix} = \begin{pmatrix} \cos\theta_z & -\sin\theta_z & 0 & 0 \\ \sin\theta_z & \cos\theta_z & 0 & 0 \\ 0 & 0 & 1 & 0 \\ 0 & 0 & 0 & 1 \end{pmatrix} \begin{pmatrix} 1 & 0 & 0 & 0 \\ 0 & \cos\theta_x & -\sin\theta_x & 0 \\ 0 & \sin\theta_x & \cos\theta_x & 0 \\ 0 & 0 & 0 & 1 \end{pmatrix} \begin{pmatrix} \cos\theta_y & 0 & \sin\theta_y & 0 \\ 0 & 1 & 0 & 0 \\ -\sin\theta_y & 0 & \cos\theta_y & 0 \\ 0 & 0 & 0 & 1 \end{pmatrix} \cdot \begin{pmatrix} X \\ Y \\ Z \\ 1 \end{pmatrix}$$

In the above formula, $(\theta_x, \theta_y, \theta_z)$ is the rotation-change angle of the object around the X-Y-Z axis. The rotation-change angle $(\theta_x, \theta_y, \theta_z)$ is previously determined by operation direction and operation point of the rotation-object.

In these ways, the environment information update section 18 updates the old position (X,Y,Z) of the object to the new position (X',Y',Z') in the environment information memory section 14.

The output section 15 displays the object which is moving from the old position (X,Y,Z) to the new position (X',Y',Z') according to the updated environment information of the object. In this case, if the type of movement of the object is parallel, the object is parallel-moving on display. If the kind of moving of the object is rotation, the object is rotation-moving on display.

Figure 24:
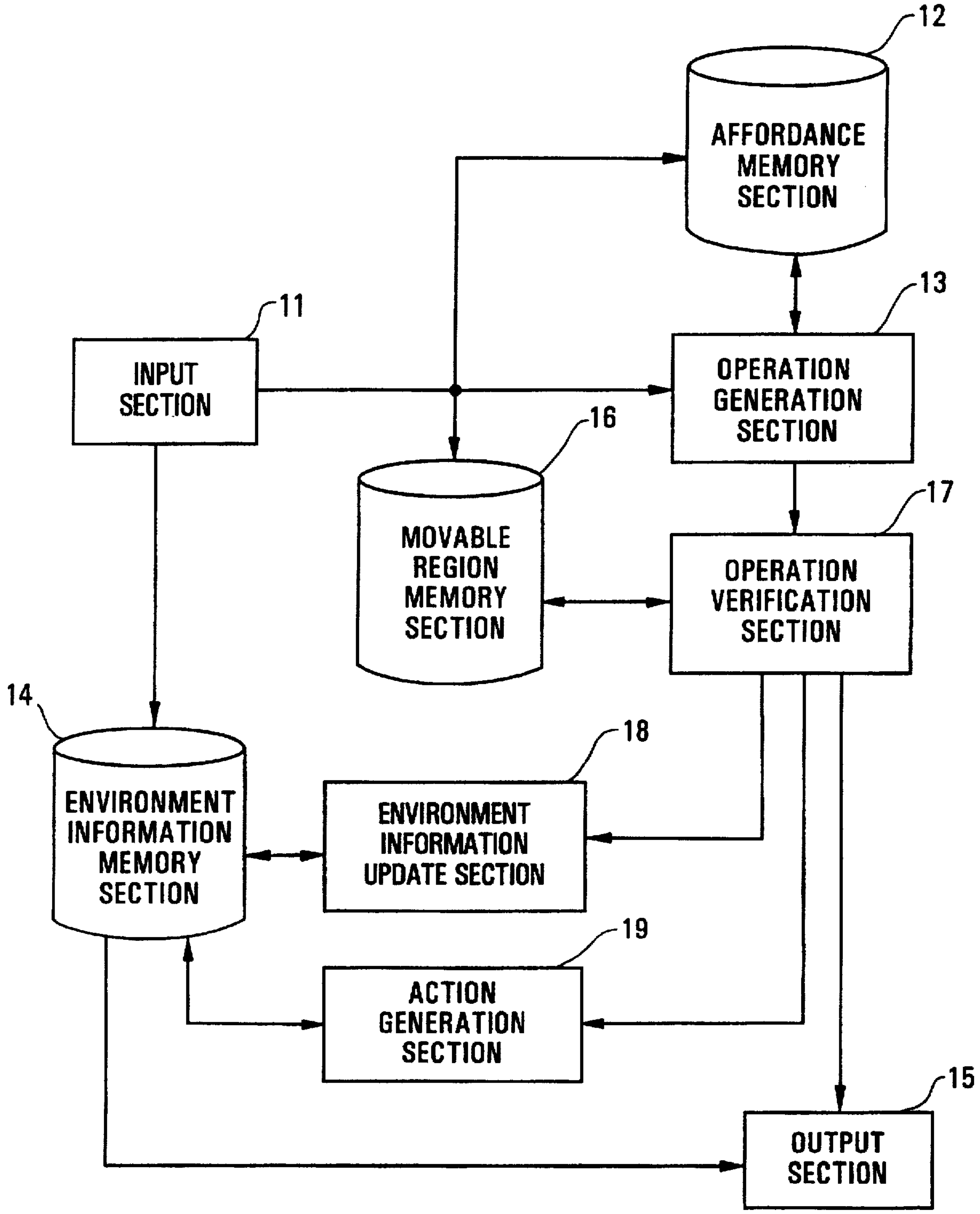
FIG. 24 is a block diagram of operation verification apparatus according to a fourth embodiment of the present invention.
Figure 25:
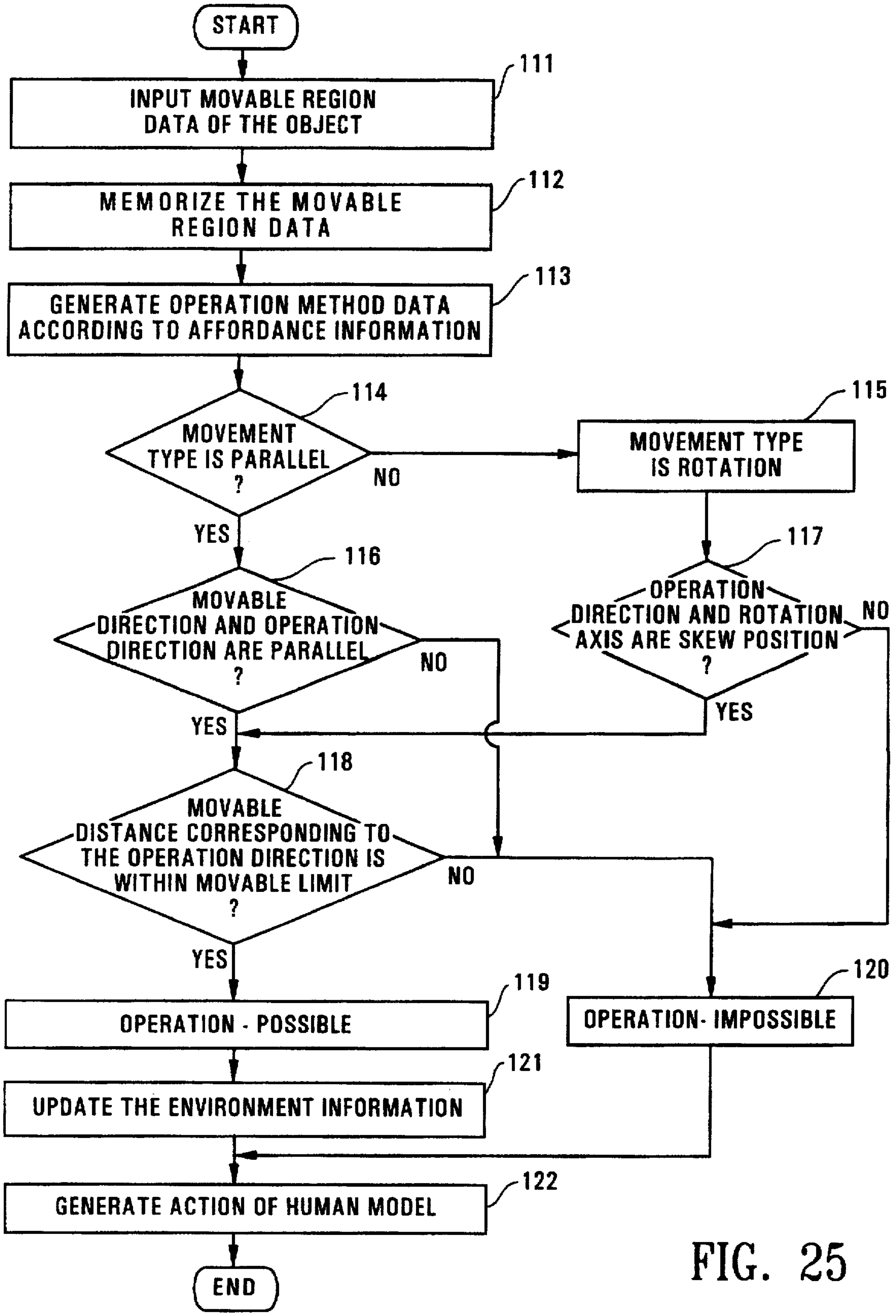
FIG. 25 is a flow chart of an operation verification method according to the fourth embodiment of the present invention.

A feature of a fourth embodiment is that a human model operates the object by the operation method data on display. FIG. 24 is a block diagram of the operation verification apparatus according to the fourth embodiment. Each section of the fourth embodiment is same as those of the third embodiment shown in FIG. 22 except for the environment information memory section 14 and the action generation section 19. The environment information memory section 14 additionally stores the environment information of the human model. The action generation section 19 generates action data of the human model according to the operation method data and updates the environment information of the human model according to the action data. FIG. 25 is a flow chart of the operation verification method according to the fourth embodiment. The flow chart of FIG. 25 is the same as that of FIG. 23 except for step 122. The process of generating action data of the human model will be explained in detail.

Figure 27:
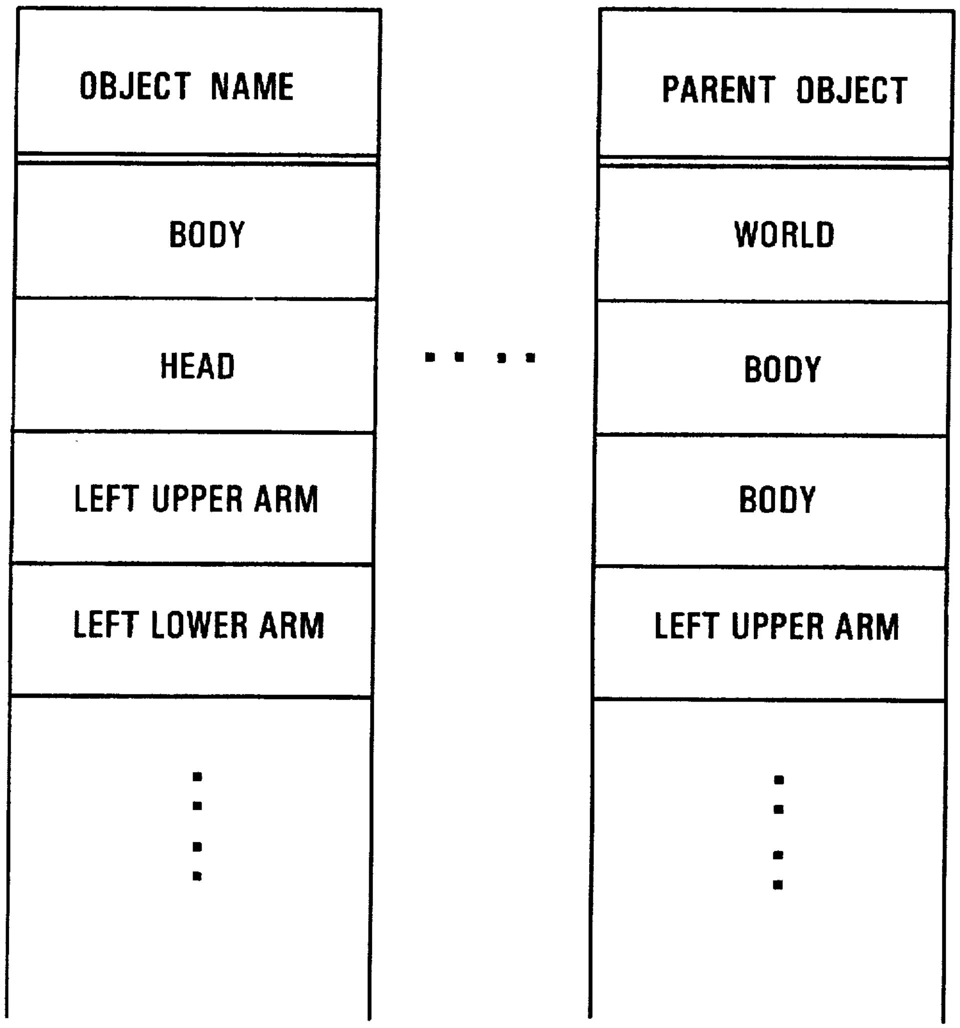
FIG. 27 is an example of the relation between object name and parent object name.
Figure 28:
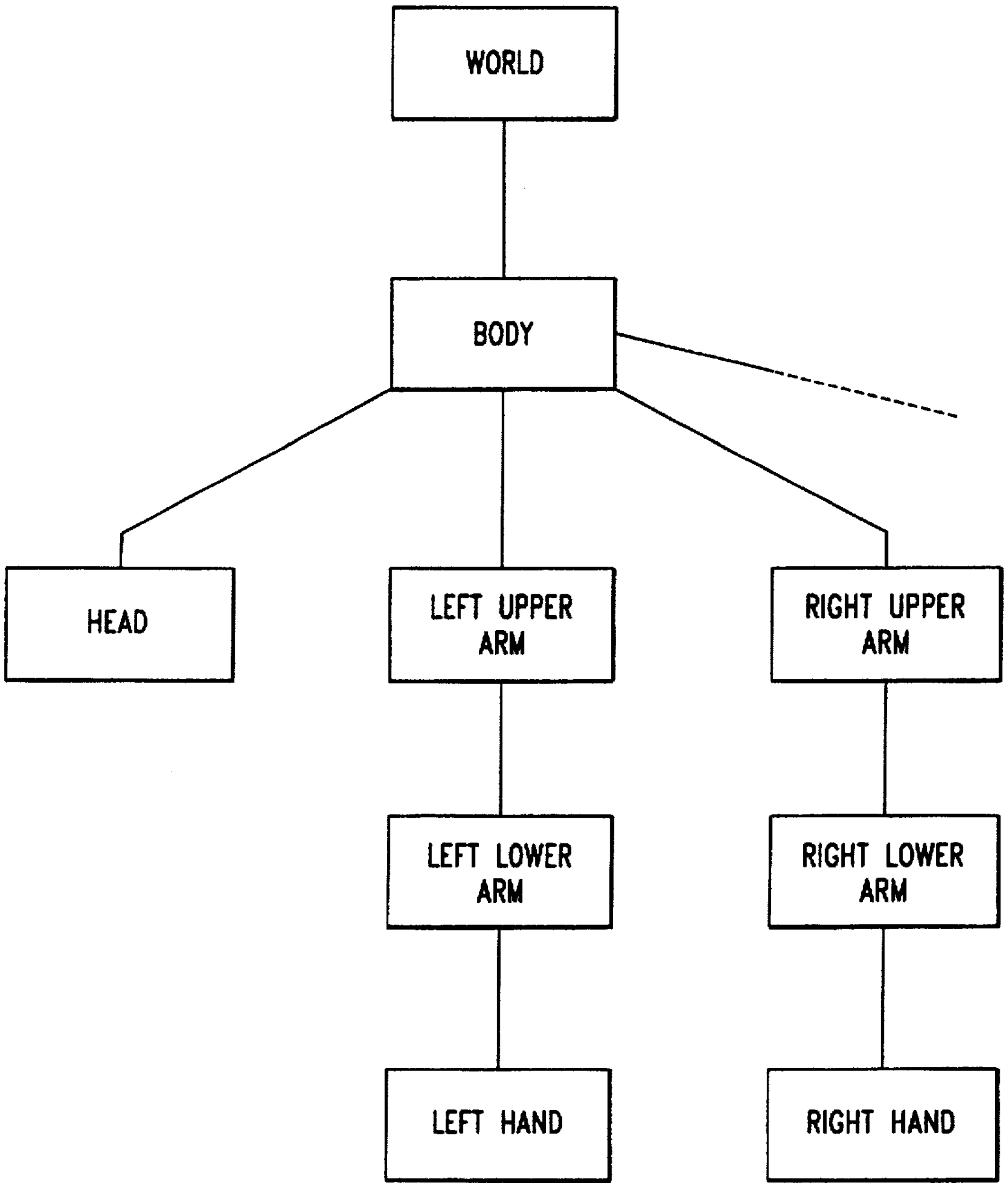
FIG. 28 is an example of a tree structure of each object of the human model.

FIG. 26 is a format of the environment information of the human model. The human model is comprised of each element (body, head, left upper arm, left lower arm, left hand, right upper arm, right lower arm, right hand, left upper leg, left lower leg, left foot, right upper leg, right lower leg, right foot). As shown in FIG. 26, position data is the center coordinate of gravity of the element in three-dimensional axis, posture data is the rotation angle of the element around three-dimensional axis, surface data is the polygon number on the element, peak coordinate is the peak position of each polygon in three-dimensional axis. In this case, the environment information of body is based on the world (global) coordinate axis. The world coordinate axis is previously fixed in the three-dimensional virtual environment. The environment information of other elements is based on parent (local) coordinate axis. The parent coordinate axis is determined by the position (posture) of the parent element in three-dimensional virtual environment. In short, each element belongs to its respective parent object and environment information of each element of the human model forms a tree-structure. FIG. 27 shows data relation between object name of each element and parent object name of each respective parent element. FIG. 28 shows the tree-structure of each element of the human model. As shown in FIGS. 27 and 28, each element of human model is represented as a multi-joint object whose base element is its respective parent object. In short, the environment information of the head, left upper arm and right upper arm is based on position (posture) of the body. The environment information of the left lower arm and right lower arm are based on position (posture) of left upper arm and right upper arm, respectively. The environment information of the left hand and right hand are based on position (posture) of the left lower arm and right lower arm, respectively.

Figure 29:
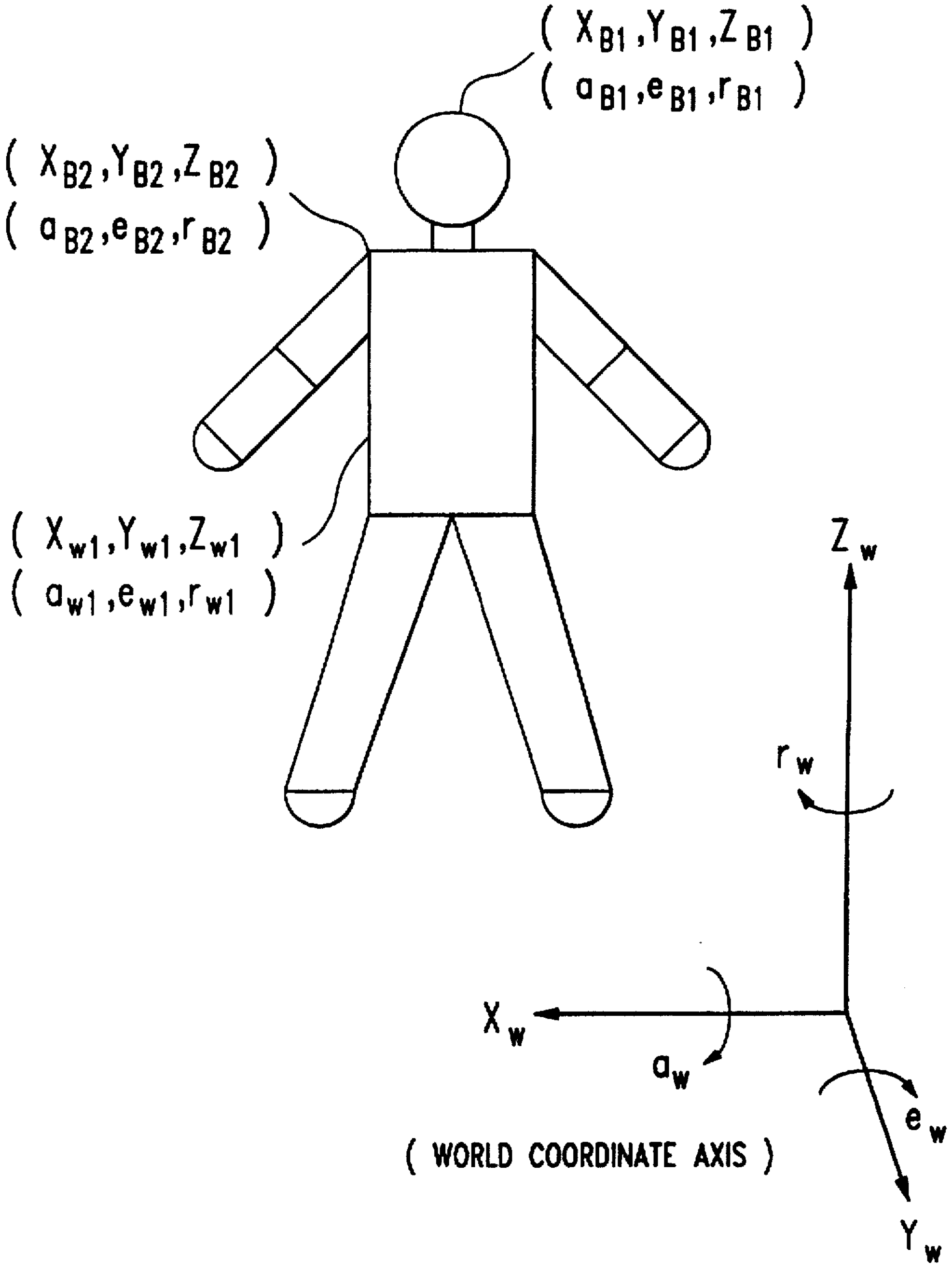
FIG. 29 is an example of the human model in the world coordinate axis and body coordinate axis.

FIG. 29 shows the position and posture of the human model in the world coordinate axis. In FIG. 29, the position data and the posture data of the body, head and left upper arm are only shown. The position $(X_{w1}, Y_{w1}, Z_{w1})$ and the posture $(a_{w1}, e_{w1}, r_{w1})$ of the body are based on the world coordinate axis. The position $(X_{B1}, Y_{B1}, Z_{B1})$ and the posture $(a_{B1}, e_{B1}, r_{B1})$ of the head, the position $(X_{B2}, Y_{B2}, Z_{B2})$ and the posture ($a_{B2}, e_{B2}, r_{B2}$) of the left upper arm are based on the body coordinate axis. (The body coordinate axis is not shown in FIG. 29)

Figure 30:
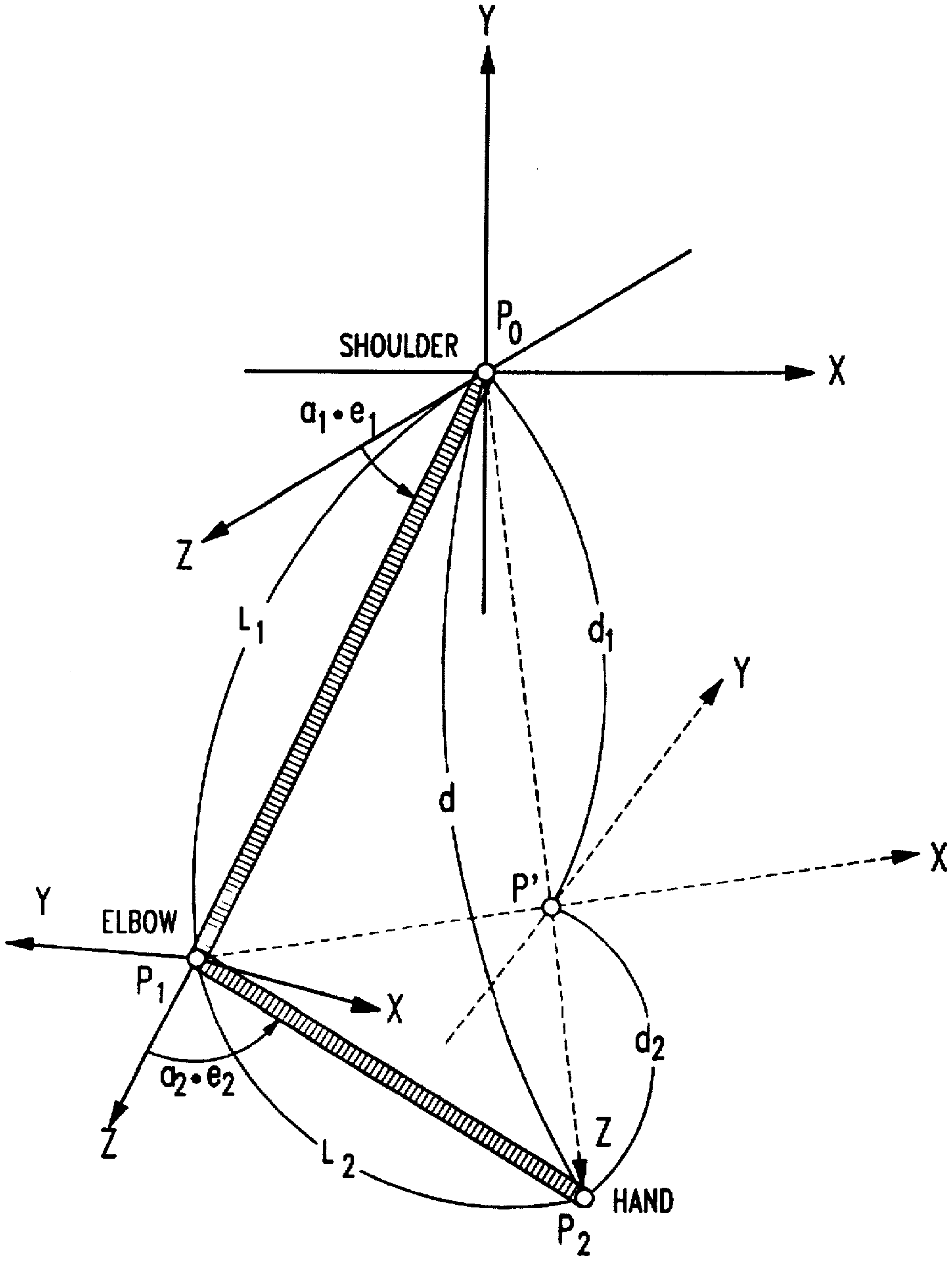
FIG. 30 is an example of action when the human model pushes an object in a three-dimensional virtual environment.

FIG. 30 shows the position relation of the right arm (right upper arm, right lower arm, right hand) in the world coordinate space. In the case that the right hand pushes the object to be operated, the calculation of the change of posture of the right upper arm and right lower arm will be explained in detail (The object is not shown in FIG. 30). It is assumed that the position of the right hand coincides with the operation point of the object. In this case, the following data is already known.

| | |
|---|---|
| position of shoulder: | $P_0 = [X_0, Y_0, Z_0]$ |
| posture of shoulder: | $[a_0, e_0, r_0]$ |
| length of upper arm: | $L_1$ |
| length of lower arm: | $L_2$ |
| position of hand: | $P_2 = [X_2, Y_2, Z_2]$ |

In the above-mentioned data, the position, the posture of shoulder and the position of hand are respectively based on the world coordinate axis. The position of the hand coincides with the operation point of the object. In this case, the following two data are calculated so that the hand might touch the operation point of the object.

posture of upper arm on coordinate axis of shoulder $P_0$: $[a_1, e_1](r_1=0)$ posture of lower arm on coordinate axis of elbow $P_1$: $[a_2, e_2](r_2=0)$ First, the coordinate axis of the shoulder is defined as follows:

the origin point: (X', Y', Z')
posture: (a', e', r')
Z-axis: ($P_2 - P_0$)
X-axis: perpendicular line from elbow ($P_1$) on Z-axis
Y-axis: perpendicular axis to X-axis and Z-axis In this case, the origin point and the posture are calculated as follows:

$$\begin{cases} X' = X_0 + d_1 \times (X_2 - X_0) \\ Y' = Y_0 + d_1 \times (Y_2 - Y_0) \\ Z' = Z_0 + d_1 \times (Z_2 - Z_0) \end{cases}$$

$$d_1 = \frac{(d^2 + L_1^2 - L_2^2)}{2d}$$

$$d = \sqrt{(X_2 - X_0)^2 + (Y_2 - Y_0)^2 + (Z_2 - Z_0)^2}$$

($d$: distance between shoulder and hand)

$$\begin{cases} a' = \tan^{-1}\dfrac{X_2 - X_0}{Z_2 - Z_0} \\ e' = \mathrm{Sin}^{-1}\dfrac{Y_2 - Y_0}{d} \\ r'\text{: free(diffuse position of elbow)} \end{cases}$$

The posture of the upper arm is calculated as follows:

$$\begin{cases} a_1 = \tan^{-1}\left(\dfrac{X_{10}}{Z_{10}}\right) \\ e_1 = -\mathrm{Sin}^{-1}\left(\dfrac{Y_{10}}{L_1}\right) \end{cases}$$

In the above formula, the position of the shoulder ($X_{10}, Y_{10}, Z_{10}$) on the coordinate axis of shoulder $P_0$ is calculated as follows:

$$\begin{pmatrix} X_{10} \\ Y_{10} \\ Z_{10} \\ 1 \end{pmatrix} = M_0^{-1} \cdot M' \cdot P_1' = M_0^{-1} \cdot M' \cdot \begin{pmatrix} -\sqrt{L_1^2 - d_1^2} \\ 0 \\ 0 \\ 1 \end{pmatrix}$$

$P_1'$: position of elbow on coordinate axis P'

$M_0$: conversion matrix from coordinate axis of shoulder $P_0$ to world coordinate axis.

$$M_0 = \begin{pmatrix} 1 & 0 & 0 & X_0 \\ 0 & 1 & 0 & Y_0 \\ 0 & 0 & 1 & Z_0 \\ 0 & 0 & 0 & 1 \end{pmatrix} \begin{pmatrix} \cos(a_0) & 0 & \sin(a_0) & 0 \\ 0 & 1 & 0 & 0 \\ -\sin(a_0) & 0 & \cos(a_0) & 0 \\ 0 & 0 & 0 & 1 \end{pmatrix} \times \begin{pmatrix} 1 & 0 & 0 & 0 \\ 0 & \cos(e_0) & -\sin(e_0) & 0 \\ 0 & \sin(e_0) & \cos(e_0) & 0 \\ 0 & 0 & 0 & 1 \end{pmatrix} \begin{pmatrix} \cos(r_0) & -\sin(r_0) & 0 & 0 \\ \sin(r_0) & \cos(r_0) & 0 & 0 \\ 0 & 0 & 1 & 0 \\ 0 & 0 & "0 & 1 \end{pmatrix}$$

M': conversion matrix from coordinate axis P' to world coordinate axis.

$$M' = \begin{pmatrix} 1 & 0 & 0 & X' \\ 0 & 1 & 0 & Y' \\ 0 & 0 & 1 & Z' \\ 0 & 0 & 0 & 1 \end{pmatrix} \begin{pmatrix} \cos(a') & 0 & \sin(a') & 0 \\ 0 & 1 & 0 & 0 \\ -\sin(a') & 0 & \cos(a') & 0 \\ 0 & 0 & 0 & 1 \end{pmatrix} \times \begin{pmatrix} 1 & 0 & 0 & 0 \\ 0 & \cos(e') & -\sin(e') & 0 \\ 0 & \sin(e') & \cos(e') & 0 \\ 0 & 0 & 0 & 1 \end{pmatrix} \begin{pmatrix} \cos(r') & -\sin(r') & 0 & 0 \\ \sin(r') & \cos(r') & 0 & 0 \\ 0 & 0 & 1 & 0 \\ 0 & 0 & 0 & 1 \end{pmatrix}$$

The posture of lower arm is calculated as follows:

$$\begin{cases} a_2 = \tan^{-1}\left(\dfrac{X_{21}}{Z_{21}}\right) \\ e_2 = -\mathrm{Sin}^{-1}\left(\dfrac{Y_{21}}{L_2}\right) \end{cases}$$

In the above formula, the position of the hand ($X_{21}, Y_{21}, Z_{21}$) on the coordinate axis of the elbow is calculated as follows.

$$\begin{pmatrix} X_{21} \\ Y_{21} \\ Z_{21} \\ 1 \end{pmatrix} = M_{10}^{-1} \cdot M_0^{-1} \cdot M' \cdot P'_2 = M_{10}^{-1} \cdot M_0^{-1} \cdot M' \cdot \begin{pmatrix} 0 \\ 0 \\ d_2 \\ 1 \end{pmatrix}$$

$P'_2$: Position of hand on coordinate axis P'

$M_{10}$: conversion matrix from coordinate axis of elbow $P_1$ to coordinate axis of shoulder $P_0$.

$$M_{10} = \begin{pmatrix} 1 & 0 & 0 & 0 \\ 0 & 1 & 0 & 0 \\ 0 & 0 & 1 & L_1 \\ 0 & 0 & 0 & 1 \end{pmatrix} \begin{pmatrix} \cos(a_1) & 0 & \sin(a_1) & 0 \\ 0 & 1 & 0 & 0 \\ -\sin(a_1) & 0 & \cos(a_1) & 0 \\ 0 & 0 & 0 & 1 \end{pmatrix} \times \begin{pmatrix} 1 & 0 & 0 & 0 \\ 0 & \cos(e_1) & -\sin(e_1) & 0 \\ 0 & \sin(e_1) & \cos(e_1) & 0 \\ 0 & 0 & 0 & 1 \end{pmatrix}$$

In the second embodiment as described above, only one affordance data is stored for each object. Therefore, if the object is decided not to be moved by the operation method, it is impossible to decide whether the object is moved by another operation method. A feature of a fifth embodiment is that plural affordance data are stored for each object and it is possible to decide whether the object is moved by plural kinds of operation method.

Figure 31:
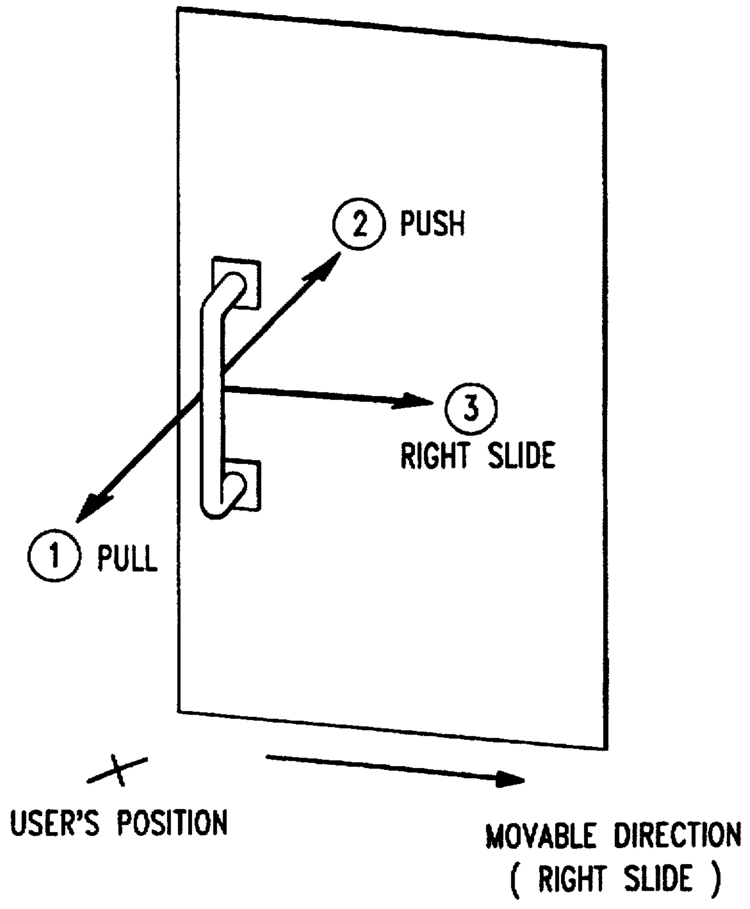
FIG. 31 is an example of plural affordances of a door handle.

FIG. 31 shows plural affordance data generated from one door, handle which is attached in the vertical direction of the door. From the figure of the door handle, the user imagines a first method of pulling the door knob toward the user, a second method of pushing the door handle on the back side, and a third method of sliding the door knob to right side.

Therefore, three affordance data of the door handle are stored in the affordance memory section 11. FIG. 32 shows a format of plural affordance data of one door handle. Each affordance data is comprised of operation surface, operation-imagination rule and priority order. The operation-imagination rule is commonly applied to three operation surfaces. As for the operation surface, the back polygon of the door handle corresponds to the first method, and so the priority order is ①. The front polygon corresponds to the second method, and so the priority order is ②. The left side of the door handle corresponds to the third method, and so the priority order is ③.

Figure 33:
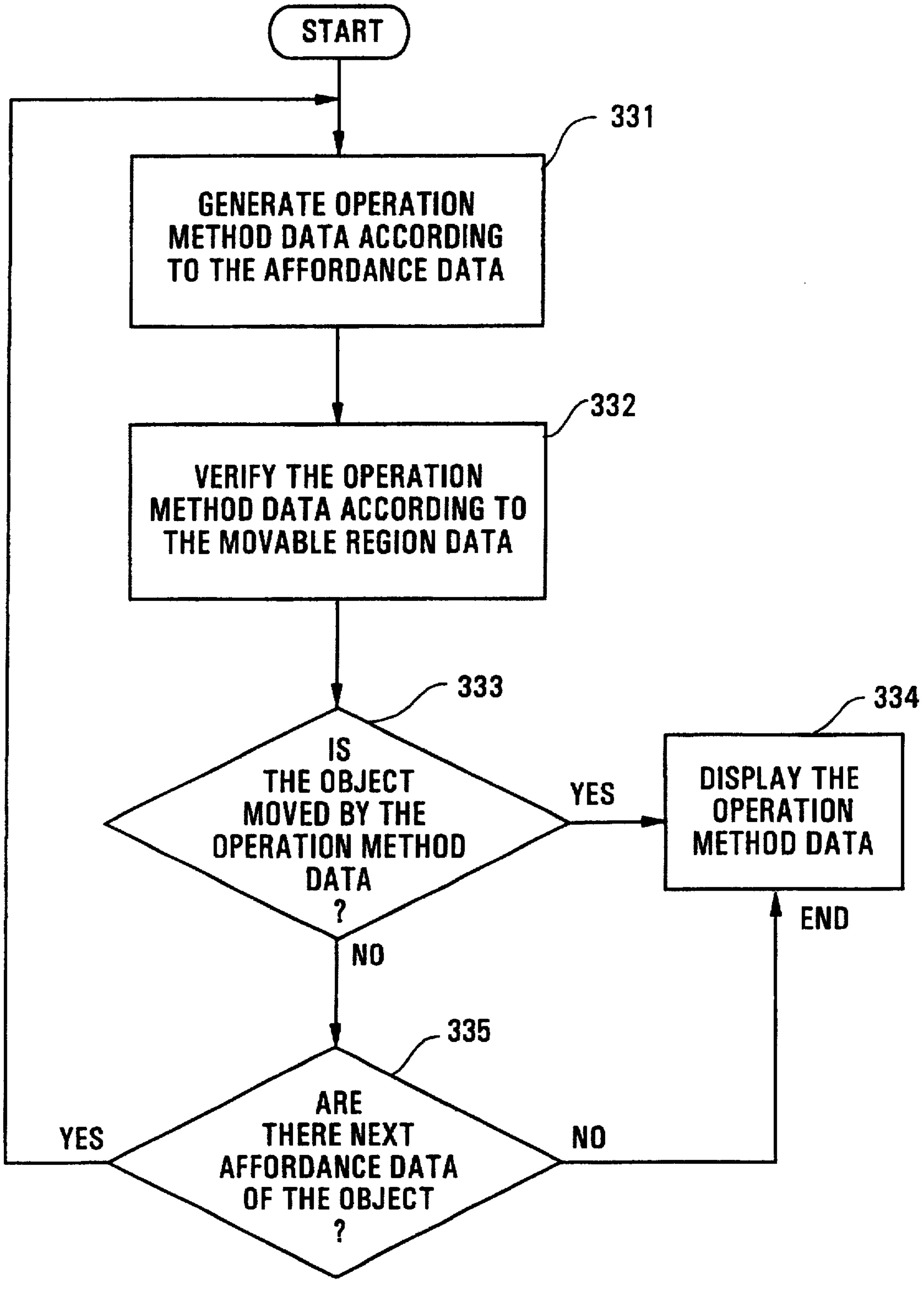
FIG. 33 is a flow chart of an operation verification method according to the fifth embodiment of the present invention.

FIG. 33 is a flow chart of the operation verification method according to the fifth embodiment. The process of generating the operation method data will be explained in detail. First, the operation generation section 13 extracts plural affordance data of the same object according to the priority order. In FIG. 32, the affordance data whose priority order is ① is extracted. Then, the operation generation section 13 generates the operation method data corresponding to priority order ① (step 331). FIG. 34 shows a format of the operation method data. In this case, operation direction ($V_{B1}$,$V_{B2}$,$V_{B3}$) and operation point ($X_{B1}$,$Y_{B1}$,$Z_{B1}$) are generated. Next, the operation verification section 17 verifies the operation method data according to the movable region data of the door handle (step 332). If the door handle is verified to be moved by the operation method, the verification result is displayed and all processing finishes (step 333,334). If the door handle is verified not to be moved by the operation method, the next affordance data corresponding to priority order ② is extracted (step 335). Then, the next operation method data corresponding to priority order ② is generated. In the same way, the operation method data corresponding to priority order ② is verified according to the movable region data of the door knob. If the door handle is decided to be moved by the operation method data, the verification result (operation direction and operation point corresponding to priority order ②) is displayed and all processing finishes. If the door handle is decided not to be moved by the operation method, the next affordance data corresponding to priority order ③ is extracted. In this case, three operation method data of the door handle are generated as shown in FIG. 34.

In the above-mentioned embodiment, the operation method data is verified according to movable region data which is previously determined by unit of object. However, it sometimes happens that the moving object conflicts with another object and the movable region of the object is restricted. In this case, it is not possible for the operation method data of the object to be verified correctly.

A feature of a sixth embodiment is that the operation method data is verified correctly even if the moving object conflicts with other object.

Figure 35:
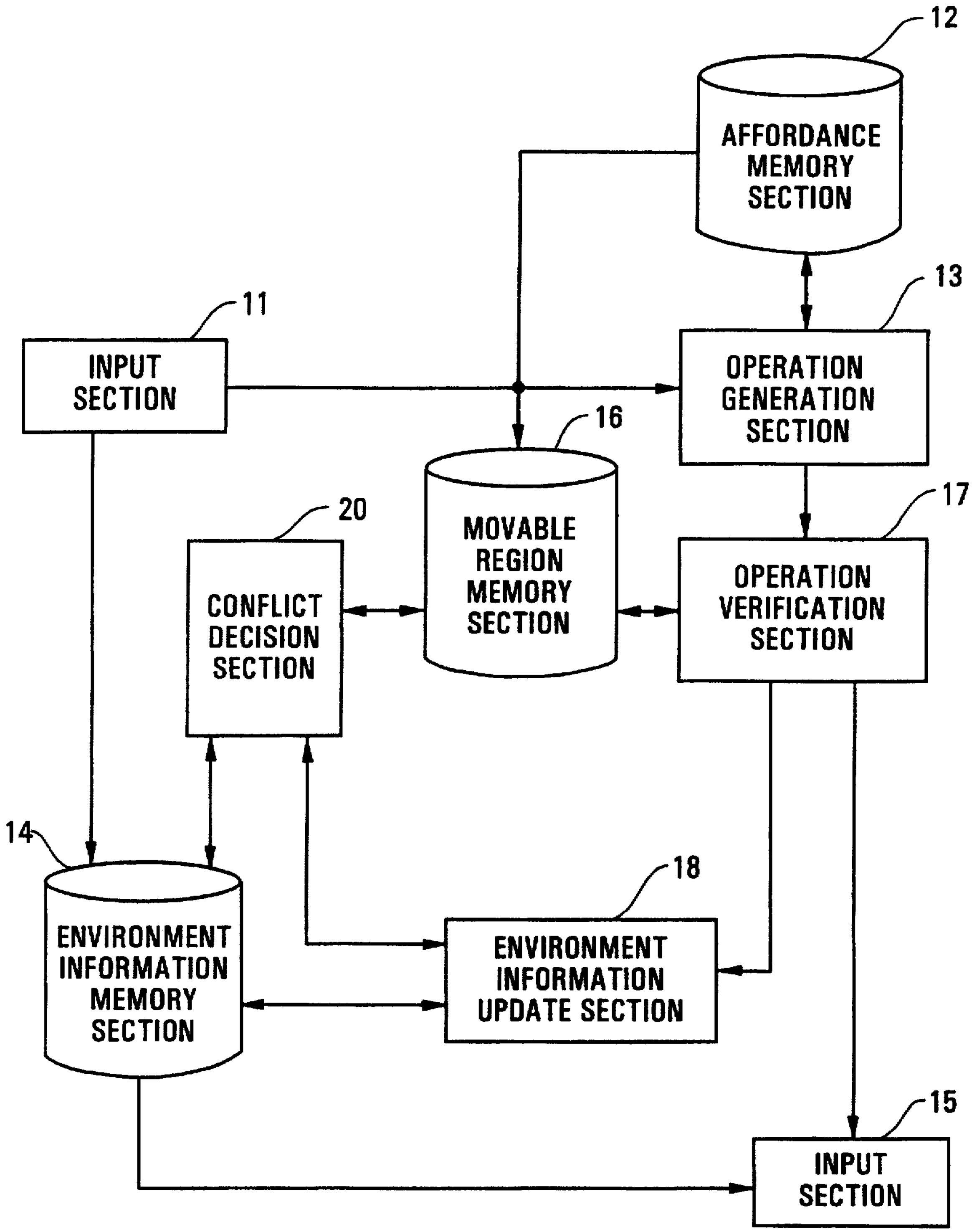
FIG. 35 is a block diagram of operation verification apparatus according to a sixth embodiment of the present invention.

FIG. 35 is a block diagram of the operation verification apparatus according to the sixth embodiment. Each section of FIG. 35 is same as that of FIG. 22 except for a conflict decision section 20. The conflict decision section 20 receives the moving data of the object from the environment information update section 18 and reads the environment information of the object and other object from the environment information memory section 14. Then, the conflict decision section 20 decides whether the object conflicts with another object during moving according to the moving data and the environment information. If the object is decided to conflict with another object, the conflict decision section 20 updates the movable region data of the object in the movable region memory section 16. If the object is decided not to conflict with another object, the conflict decision section 20 updates the environment information of the object in the environment information memory section 14.

Figure 36:
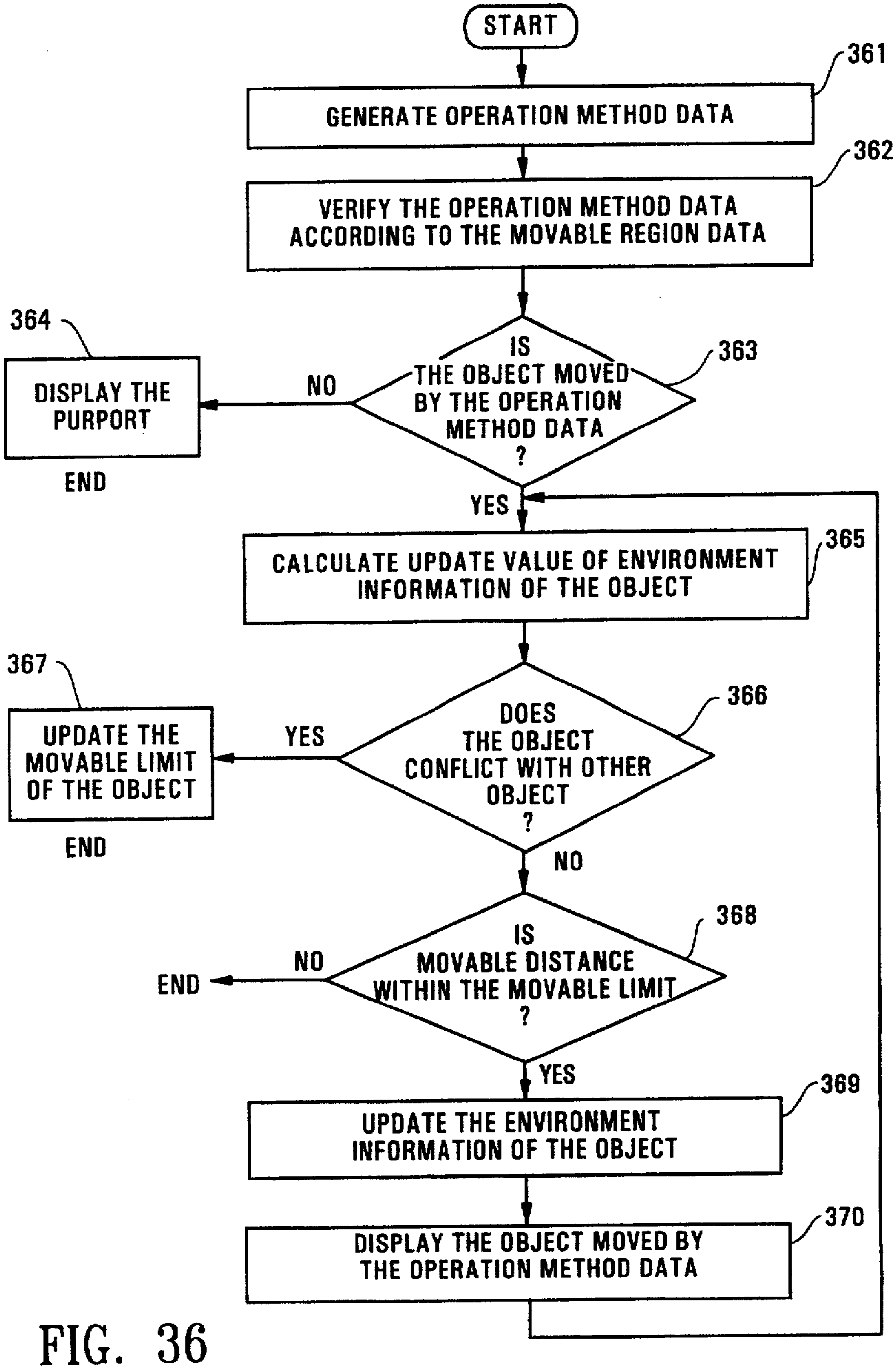
FIG. 36 is a flow chart of an operation verification method according to the sixth embodiment of the present invention.
Figure 37:
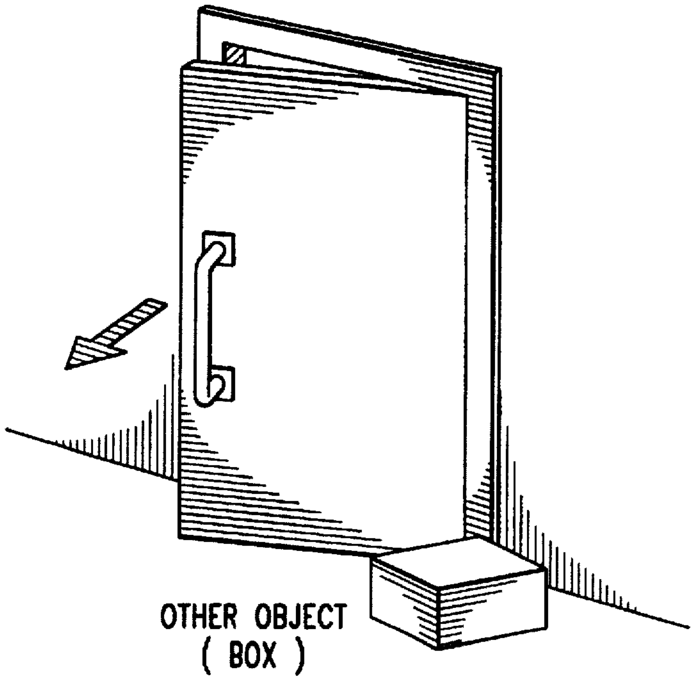
FIG. 37 is an example of conflict between a door being opened and another object.
Figure 38:
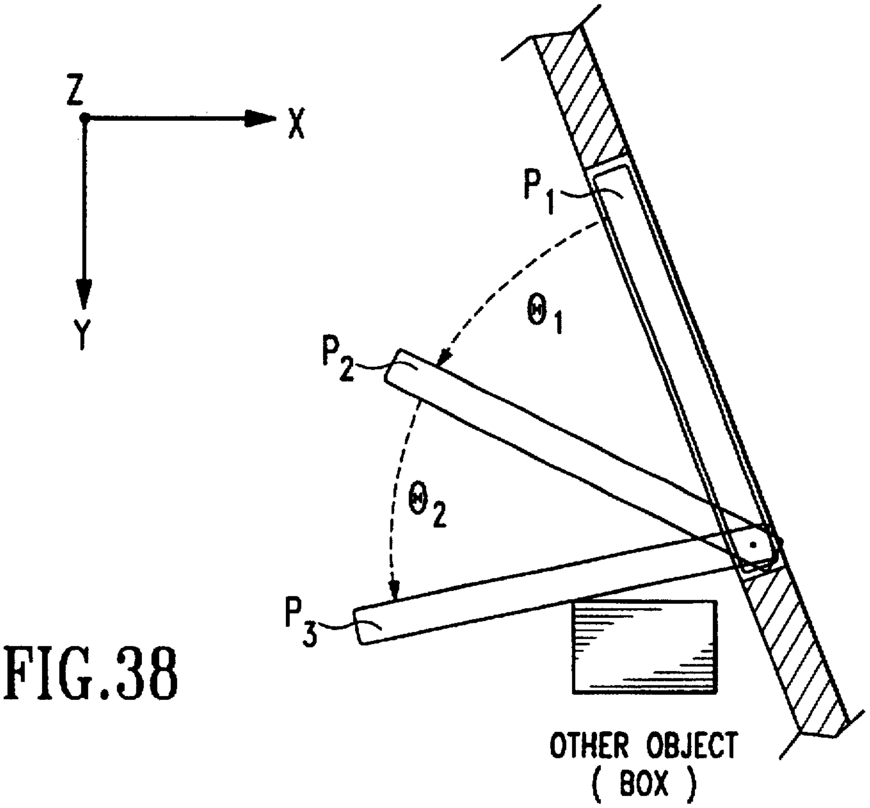
FIG. 38 is an example of a plane of conflict between the door being opened and the other object.

FIG. 36 is a flow chart of the operation verification method according to the sixth embodiment. The process of verification of the operation method data will be explained in detail. As described above, the operation generation section 13 generates the operation method data of the object according to the affordance data (step 361). The operation verification section 17 verifies the operation method data according to the movable region data of the object (step 362). If the object is decided not to be moved by the operation method, the output section 15 displays the result and the processing finishes (step 363,364). If the object is decided to be moved by the operation method, the environment information update section 18 calculates moving data of the object (update value of the environment information) (step 365). This calculation processing is explained in the third embodiment. Then, the moving data and the movable region data of the object are sent to the conflict decision section 20. The conflict decision section 20 reads the environment information of the object and other object from the environment information memory section 14. Next, the conflict decision section 20 decides whether the object conflicts with the other object when the object is moved by the operation method data (step 366). In this regard, the conflict decision section 20 calculates a boundary box (projection to X-Y plane) of the object and other object. It is assumed that the object is a door and the other object is a box on the floor, and first moving data of the door is angle $\theta_1$. FIG. 37 shows an example of the door and the box on the floor. FIG. 38 shows an example of the boundary box of the door ($P_1$,$P_2$,$P_3$) and the box on the X-Y plane (floor). As shown in FIG. 38, if the door is rotated from the initial position ($P_1$) to the next position ($P_2$) by the first moving angle $\theta_1$, the door does not conflict with the box. The first moving angle $\theta_1$ is within the movable limit of the door apparently (step 368). (The movable limit of the door is the upper limit-angle to which the door is opened) Therefore, the conflict decision section 20 updates the environment information (position and posture) of the door (step 369). In short, the position and posture data of the door ($P_1$) is changed by that of the door ($P_2$). The output section 15 displays the door which is rotated from position ($P_1$) to position ($P_2$) according to the updated environment information (step 370). Next, it is assumed that second moving data of the door is angle $\theta_2$ (step 365). In this case, if the door is rotated from position ($P_2$) to position ($P_3$) by the second moving angle $\theta_2$, the door conflicts with the box (step 366). In short, moving of the door from position ($P_2$) is restricted by the second moving angle $\theta_2$. Therefore, the moving of the door from the initial position ($P_1$) is restricted by moving angle ($\theta_1$+$\theta_2$). Accordingly, the conflict decision section 20 updates the moving limit of the moving region data of the door (step 367). As shown in FIG. 10 of the second embodiment, the upper limit of the moving limit is the angle (distance) measured from the initial position of the object. It is assumed that the door is "OBJECT 2" in FIG. 10 because the type of movement of "OBJECT 2" is "ROTATE". In this case, the initial position ($I_{21}$,$I_{22}$,$I_{23}$) corresponds to the position ($P_1$) shown in FIG. 38. Therefore, the upper limit (MAX2) of "OBJECT 2" is updated by moving angle ($\theta_1$+$\theta_2$ ). In these ways, until the object conflicts with another object during moving or the object moves beyond the movable limit, the processing steps (365~370) are executed repeatedly.

Additional advantages And modifications will readily occur to those skilled in the art. The invention in its broader aspects is therefore not limited to the specific details, representative apparatus and method, and illustrative examples shown and described. Accordingly, departures may be made from such details without departing from the spirit or scope of the general inventive concept. Thus, it is intended that this invention cover the modifications and variations of the invention provided they are within the scope of the appended claims and their equivalents.

What is claimed is:

1. An operation verification apparatus comprising:

affordance data memory means for storing affordance data for an object, the affordance data being capable of relating a plurality of operations to be performed on an object, one of which is intuitive from an appearance of said object, said affordance data corresponding to a set of rules for generating operation method data corresponding to said intuitive operation, said affordance data comprising data identifying one of a plurality of surfaces of said object as an operational surface, data defining a center point of said operational surface as an operation point of said object, and a vector opposite in direction to a vector which is normal to the operation surface as an operation direction vector of said object;

environment information memory means for storing environment information for said object, said environment information comprising position data defining a position of said object in a virtual environment, posture data defining a posture of said object in said virtual environment and figure data defining said appearance of said object, said figure data comprising data defining a plurality of surfaces of said object including peak coordinates of each said surface; and operation generation means for generating operation method data for said object in accordance with said affordance data and said environment information, said operation method data comprising the operation point and the operation direction vector of said object.

2. The operation verification apparatus of claim 1 further comprising:

movable region memory means for storing movable region data defining a movable region in said virtual environment within which said object is allowed to move; and operation verification means for determining whether said operation method data generated by said operation generation means corresponds to a movement of said object that occurs entirely within said movable region.

3. The operation verification apparatus according to claim 2 further comprising:

environment information update means for calculating a coordinate-transformation matrix of movement within the movable region of the object when the object is verified to be movable, and for updating the environment information of the object by multiplying the coordinate-transformation matrix with the position data of the object to provide an update value.

4. The operation verification apparatus according to claim 3, further comprising:

conflict decision means for deciding whether a first object, whose environment information is updated, conflicts with a second object in the virtual environment in accordance with the update value of the first object and the environment information of the second object.

5. The operation verification apparatus according to claim 4, wherein said conflict decision means includes means for restricting the movable region data of the first object in accordance with the update value if the first object is decided to conflict with the second object, and for updating the environment information of the first object in accordance with the update value if the first object is decided not to conflict with the second object and the update value is within the movable region of the first object.

6. The operation verification apparatus according to claim 3, further comprising:

display means for displaying the object being moved in the virtual environment in accordance with the updated environment information and non-updated environment information of the object.

7. The operation verification apparatus according to claim 2, wherein said environment information includes each element of a human model in the virtual environment, wherein in the human model, position data and posture data of a body of the model is based on a global coordinate axis in the virtual environment, and the position data and the posture data of each element of the model is based on a three-dimensional axis of a respective parent element, so that each element is associated with its respective parent element.

8. The operation verification apparatus according to claim 7 further comprising:

action generation means for calculating action data of each element of the human model to operate the object in the virtual environment in accordance with the operation method data, wherein the action data includes change data of posture of the element, and for updating the environment information of the human model by using the action data.

9. The operation verification apparatus according to claim 2, wherein said affordance data memory means stores a plurality of sets of rules for generating operation method data for the object, and each set of rules includes a priority order.

10. The operation verification apparatus according to claim 9, wherein said operation generation means includes means for generating operation method data corresponding to each set of rules in accordance with the priority order, and wherein said operation verification means includes means for verifying whether the object is moved by each operation method data in accordance with the priority data.

11. The operation verification apparatus according to claim 2, wherein said operation generation means includes means for calculating center coordinates of plural polygons on a side surface of the object and tangent lines in a rotation direction from each center coordinate as a point of contact on the polygon, in accordance with the environment information of the object, and for generating plural sets of operation point and operation direction as operation method data, wherein the operation point is the center coordinate and the operation direction vector is along a direction of the tangent line.

12. The operation verification apparatus of claim 2, wherein said movable region data further comprises data defining a movable direction of said object and a movement type of said object.

13. The operation verification apparatus of claim 12, wherein said operation verification means comprises means for determining whether said operation direction vector and said movable direction data are parallel if said movement type is parallel.

14. The operation verification apparatus of claim 12, wherein said operation verification means comprises means for determining whether said operation direction vector is skewed from said movable direction data if said movement type is rotational.

15. The operation verification apparatus of claim 1 further comprising display means for displaying said operation point and said operation direction vector generated by said operation generation means.

16. An operation verification method comprising:

inputting affordance data for an object, the affordance data being capable of relating a plurality of operations to be performed on an object, one of which is intuitive from an appearance of said object, said affordance data comprising data identifying one of a plurality of surfaces of said object as an operational surface, data defining a center point of said operational surface as an operation point of said object, and a vector opposite in direction to a vector that is normal to the operation surface as an operation direction vector of said object;

inputting environment information for said object, said environment information comprising position data defining a position of said object in a virtual environment, posture data defining a posture of said object in said virtual environment and figure data defining said appearance of said object, said figure data comprising data defining a plurality of surfaces of said object including peak coordinates of each said surface; and generating operation method data for said object in accordance with said affordance data and said environment information, said operation method data comprising the operation point and the operation direction vector of said object.

17. The operation verification method of claim 16 further comprising:

inputting movable region data defining a movable region in said virtual environment within which said object is allowed to move; and determining whether said operation method data corresponds to a movement of said object that occurs entirely within said movable region.

18. A computer readable memory containing computer readable instructions comprising:

instruction means for causing a computer to input affordance data for an object, the affordance data being capable of relating a plurality of operations to be performed on an object, one of which is intuitive from an appearance of said object, said affordance data corresponding to a set of rules for generating operation method data corresponding to said intuitive operation, said affordance data comprising data identifying one of a plurality of surfaces of said object as an operational surface, data defining a center point of said operational surface as an operation point of said object, and a vector opposite in direction to a vector that is normal to the operation surface as an operation direction vector of said object;

instruction means for causing a computer to input environment information for said object, said environment information comprising position data defining a position of said object in a virtual environment, posture data defining a posture of said object in said virtual environment and figure data defining said appearance of said object, said figure data comprising data defining a plurality of surfaces of said object including peak coordinates of each said surface; and instruction means for causing a computer to generate operation method data for said object in accordance with said affordance data and said environment information, said operation method data comprising the operation point and the operation direction vector of said object.

19. The computer readable media of claim 18 further comprising:

instruction means for causing a computer to input movable region data defining a movable region in said virtual environment within which said object is allowed to move; and instruction means for causing a computer to determine whether said operation method data corresponds to a movement of said object that occurs entirely within said movable region.

* * * * *